United States Patent
Kim et al.

(10) Patent No.: US 10,602,443 B2
(45) Date of Patent: Mar. 24, 2020

(54) METHOD AND DEVICE FOR SAVING POWER CONSUMPTION OF ELECTRONIC DEVICE IN MACHINE TYPE COMMUNICATION TECHNOLOGY

(71) Applicant: Samsung Electronics Co., Ltd., Suwon-si, Gyeonggi-do (KR)

(72) Inventors: Sangbum Kim, Suwon-si (KR); Kyeongin Jeong, Yongin-si (KR); Soenghun Kim, Suwon-si (KR); Juho Lee, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 15/565,889

(22) PCT Filed: Apr. 20, 2016

(86) PCT No.: PCT/KR2016/004119
§ 371 (c)(1),
(2) Date: Oct. 11, 2017

(87) PCT Pub. No.: WO2016/171469
PCT Pub. Date: Oct. 27, 2016

(65) Prior Publication Data
US 2018/0110002 A1    Apr. 19, 2018

(30) Foreign Application Priority Data

Apr. 24, 2015 (KR) .................. 10-2015-0058226

(51) Int. Cl.
*H04W 52/02* (2009.01)
*H04L 1/00* (2006.01)
(Continued)

(52) U.S. Cl.
CPC ....... *H04W 52/0216* (2013.01); *H04L 1/0053* (2013.01); *H04W 4/70* (2018.02);
(Continued)

(58) Field of Classification Search
CPC .......... H04L 1/00; H04L 1/0053; H04L 1/08; H04W 52/02; H04W 4/70;
(Continued)

(56) References Cited

U.S. PATENT DOCUMENTS

2007/0153833 A1    7/2007  Chang et al.
2008/0031250 A1*   2/2008  Mehta ............... H04L 45/24
                                                370/392
(Continued)

FOREIGN PATENT DOCUMENTS

CN    103199975 A    7/2013
CN    103929779 A    7/2014
(Continued)

OTHER PUBLICATIONS

Extended European Search Report and European Search Opinion for European Patent Application No. 16783402.7 dated Mar. 19, 2018; 9 pages.
(Continued)

*Primary Examiner* — Mark H Rinehart
*Assistant Examiner* — Kenneth P Hunt

(57) ABSTRACT

Provided are a communication method and system that integrate 5G communication systems with IoT technologies to support higher data rates after 4G systems. The present disclosure is based on 5G communication technologies and IoT related technologies, and may be applied to intelligent services such as smart homes, smart buildings, smart cities, smart or connected cars, health care, digital education, retail, and security and safety.
The present disclosure relates to a method and apparatus for reducing power consumption in an electronic device sup-
(Continued)

porting machine type communication. There is provided a method of signal processing for an electronic device in a mobile communication system. The method may include: obtaining repetition level information for signal reception; determining a decoding start point and decoding period; and making, if the decoding start point arrives, an attempt to decode the repeatedly received signal at every decoding period on the basis of the repetition level information.

15 Claims, 22 Drawing Sheets

(51) Int. Cl.
*H04W 4/00* (2018.01)
*H04W 4/70* (2018.01)
(52) U.S. Cl.
CPC ... *H04W 52/0229* (2013.01); *H04W 52/0238* (2013.01); *Y02D 70/00* (2018.01)
(58) Field of Classification Search
CPC ......... H04W 52/0216; H04W 52/0229; H04W 52/0238; H04W 52/00–0296; H04W 52/0209; H04W 52/0212; H04W 52/0219; H04W 52/0222; H04W 52/0225; H04W 52/0235; H04W 52/0248; Y02D 70/126; Y02D 70/1262; Y02D 70/1242; Y02D 70/23; Y02D 70/21; Y02D 70/24; Y02D 70/00
See application file for complete search history.

(56) References Cited

U.S. PATENT DOCUMENTS

| | | |
|---|---|---|
| 2014/0003374 A1 | 1/2014 | Kuo |
| 2014/0133430 A1 | 5/2014 | Yang et al. |
| 2015/0029923 A1 | 1/2015 | Xu et al. |
| 2015/0098447 A1 | 4/2015 | Kim et al. |
| 2015/0358996 A1* | 12/2015 | Fang ................. H04W 72/1278 370/280 |
| 2015/0365924 A1* | 12/2015 | Gao ......................... H04L 1/08 370/329 |
| 2016/0143017 A1 | 5/2016 | Yang et al. |
| 2016/0212737 A1 | 7/2016 | Jang et al. |
| 2016/0330723 A1* | 11/2016 | Gao ......................... H04B 7/26 |
| 2017/0303248 A1* | 10/2017 | Chatterjee ............... H04L 1/189 |
| 2018/0007605 A1* | 1/2018 | Eriksson ............... H04W 24/10 |
| 2019/0081739 A1* | 3/2019 | Nammi ................ H04B 7/0626 |

FOREIGN PATENT DOCUMENTS

| | | |
|---|---|---|
| KR | 10-0880171 B1 | 1/2009 |
| KR | 10-2014-0136458 A | 11/2014 |
| WO | 2013002577 A2 | 1/2013 |
| WO | 2014110781 A1 | 7/2014 |
| WO | 2014200396 A1 | 12/2014 |
| WO | 2015012665 A1 | 1/2015 |
| WO | 2015017374 A1 | 2/2015 |
| WO | 2015043040 A1 | 4/2015 |

OTHER PUBLICATIONS

ISA/KR, "International Search Report," Application No. PCT/KR2016-004119, dated Jul. 26, 2016, Korean Intellectual Property Office, 2 pages.
ISA/KR, "Written Opinion of the International Searching Authority," Application No. PCT/KR2016-004119, dated Jul. 26, 2016, Korean Intellectual Property Office, 4 pages.
Intel Corporation, "PBCH repetitions for coverage enhancement for MTC," R1-150083, 3GPP TSG RAN WG1 Meeting #80, Athens, Greece, Feb. 19-13, 2015, 8 pages.
China National Intellectual Property Administration, "The First Office Action," Application No. CN201680023779.6, dated Nov. 27, 2019, 16 pages.

* cited by examiner

METHOD AND DEVICE FOR SAVING POWER CONSUMPTION OF ELECTRONIC DEVICE IN MACHINE TYPE COMMUNICATION TECHNOLOGY

CROSS-REFERENCE TO RELATED APPLICATIONS

The present application claims priority under 35 U.S.C. § 365 and is a 371 National Stage of International Application No. PCT/KR2016/004119 filed Apr. 20, 2016, which claims the benefit of Korean Patent Application No. 10-2015-0058226 filed Apr. 24, 2015, the disclosures of which are fully incorporated herein by reference into the present disclosure as if fully set forth herein.

TECHNICAL FIELD

The present invention relates to a signal processing method for reducing power consumption in an electronic device supporting machine type communication technology.

BACKGROUND

Since commercial deployment of 4G communication systems, to meet the ever increasing demand for wireless data traffic, efforts have been made to develop improved 5G or pre-5G communication systems. As such, 5G or pre-5G communication systems are also called "beyond 4G network" or "post LTE system". To achieve higher data rates, 5G communication systems consider utilization of the mmWave band (e.g. 60 GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems. To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), reception interference cancellation, and the like. In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

Meanwhile, the Internet is evolving from a human centered network where humans create and consume information into the Internet of Things (IoT) where distributed elements or things process and exchange information. There has also emerged the Internet of Everything (IoE) technology that combines IoT technology with big data processing technology through connection with cloud servers. To realize IoT services, base technologies such as sensing, wired/wireless communication and network infrastructure, service interfacing and security are needed, and technologies interconnecting things such as sensor networks, Machine-to-Machine (M2M) or Machine Type Communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine or machine type communication are being realized by use of 5G communication technologies including beamforming, MIMO and array antennas. Application of cloud RANs to big data processing described above may be an instance of convergence of 5G communication technology and IoT technology.

In general, mobile communication systems have been developed to provide communication services while guaranteeing user mobility. Thanks to rapid technological advancement, mobile communication systems are capable of providing not only voice communication services but also high-speed data communication services. The local area communication technology has also been developed so rapidly that one user may have a variety of short-range communication devices as well as a mobile communication terminal.

Advanced communication technology enables communication between things as well as between users, which is represented by the term "machine type communication (MTC)". MTC devices are expected to have poor reception sensitivity owing to various factors such as single antenna, low cost receiver, installation in a poor channel environment.

SUMMARY

Technical Problem

In MTC technology, the base station provides an extended coverage area to MTC devices through repeated transmission. MTC devices can also enjoy the extended coverage area through repeated transmission to the base station. However, such repeated transmissions force MTC devices and base stations to consume more power. Hence, there is a need for a method to address this problem.

Solution to Problem

In accordance with an aspect of the present invention, there is provided a method of signal processing for an electronic device in a mobile communication system. The method may include: obtaining repetition level information to receive a signal; determining a decoding start point and decoding period; and making, if the decoding start point arrives, an attempt to decode the repeatedly received signal at every decoding period on the basis of the repetition level information.

In accordance with another aspect of the present invention, there is provided an electronic device capable of signal processing in a mobile communication system. The electronic device may include: a transceiver to send and receive a signal; and a controller to perform obtaining repetition level information for signal reception, determining a decoding start point and decoding period, and making, if the decoding start point arrives, an attempt to decode the repeatedly received signal at every decoding period on the basis of the repetition level information.

Advantageous Effects of Invention

In a feature of the present invention, the electronic device such as a base station or an MTC device can save power consumed due to decoding of repeatedly received signals by setting a decoding start point and decoding period for a repeatedly received signal.

In addition, the electronic device can more adaptively reduce power consumption by changing the decoding start point and decoding period according to the channel state, the channel state change, and the type of a message to receive.

DETAILED DESCRIPTION

Figure 1:
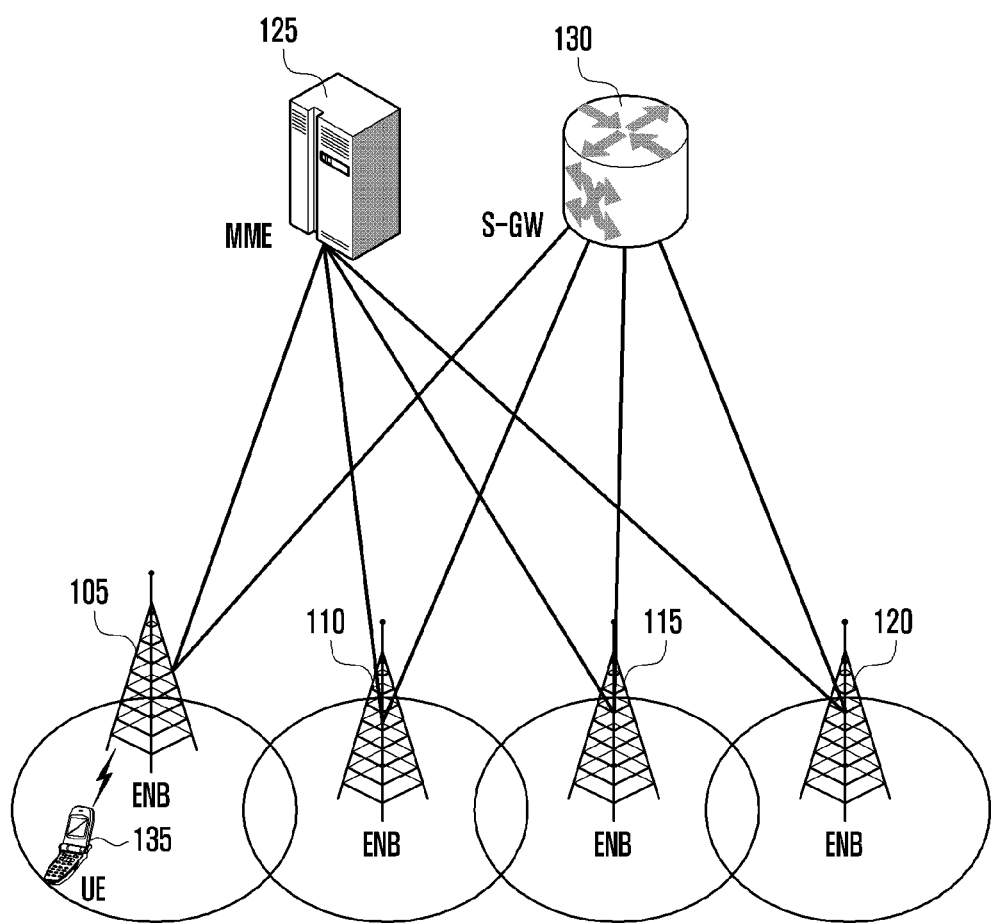
FIG. 1 illustrates the architecture of an LTE system to which the present invention is applied.

Hereinafter, the present invention is described with reference to the accompanying drawings. It should be appreciated that the present description is not limited to a specific embodiment and all modifications, equivalents and/or alternatives thereof also belong to the scope of the present invention. The same or similar reference symbols are used throughout the drawings to refer to the same or like parts.

In the description, an expression "have", "may have", "include" or "may include" indicates the existence of a specific feature (e.g. function, operation, or component) and does not exclude the existence of other features. It is thus to be interpreted as specifying the presence of the stated features, numbers, steps, operations, elements, components, or groups thereof, but does not preclude the presence or addition of one or more other features, numbers, steps, operations, elements, components, or groups thereof.

In the description, the expression "A or B" may indicate all possible combinations of A and B. For example, "A or B", may indicate any of including at least one A, including at least one B, and including at least one A and at least one B.

In the description, the terms "first" and "second" may modify various elements regardless of importance and/or order and are used to distinguish one element from another element without limitation. For example, a first user device and a second user device may indicate different user devices regardless of the order or importance of the devices. As another example, a first component may be denoted as a second component, and vice versa, without departing from the scope of the present invention.

It will be understood that when a first element is referred to as being "coupled with/to" or "connected with/to" a second element, it can be coupled or connected with/to the second element directly or via a third element. In contrast, it will be understood that when a first element is referred to as being "directly coupled with/to" or "directly connected with/to" a second element, no other element intervenes between the first element and the second element.

Some terms used herein may be provided merely to describe a specific embodiment without limiting the scope of another embodiment. In the description, the singular forms "a", "an" and "the" are intended to include the plural forms as well, unless the context clearly indicates otherwise.

The terms including technical and scientific terms used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The following description is focused on the LTE system. However, it should be understood by those skilled in the art that the subject matter of the present invention is applicable to other communication systems having similar technical backgrounds and channel configurations without significant modifications departing from the scope of the present invention.

In the following description of various embodiments, the "electronic device" in a wireless communication system may refer to a user equipment and/or a base station. In addition, the "electronic device" may refer to a machine-type communication (MTC) device, an MTC terminal, and/or a base station.

In the following description of various embodiments, the "signal" exchanged between electronic devices in a wireless communication system may refer to various types of signals such as control information and data. The signal may be exchanged as a message between electronic devices.

FIG. 1 illustrates the architecture of an LTE system to which the present invention is applied.

As shown in FIG. 1, the radio access network of the LTE system is composed of base stations (Evolved Node Bs, ENBs) 105, 110, 115 and 120, a mobility management entity (MME) 125, and a serving-gateway (S-GW) 130. A user equipment (UE or terminal) 135 may connect to an external network through the ENBs 105 to 120 and the S-GW 130.

In FIG. 1, the ENBs 105 to 120 correspond to Node Bs of the universal mobile telecommunications system (UMTS), but perform more complex functions in comparison to existing Node Bs. The ENBs 105 to 120 may be connected to the UE 135 through wireless channels. In the LTE system, all user traffic including real-time services like VoIP (Voice over IP) services is served by shared channels. Hence, it is necessary to perform scheduling on the basis of collected status information regarding buffers, available transmit powers and channels of UEs. Each of the ENBs 105 to 120 performs this scheduling function. One ENB 105, 110, 115 or 120 may control multiple cells. To achieve a data rate of 100 Mbps in a 20 MHz bandwidth, the LTE system utilizes orthogonal frequency division multiplexing (OFDM) as radio access technology. The LTE system employs adaptive modulation and coding (AMC) to determine the modulation scheme and channel coding rate according to channel states of UEs. The S-GW 130 may provide data bearers, and may create and remove data bearers under the control of the MME 125. The MME 125 is connected to multiple ENBs 105 to 120 and performs various control functions including mobility management for UEs.

Figure 2:
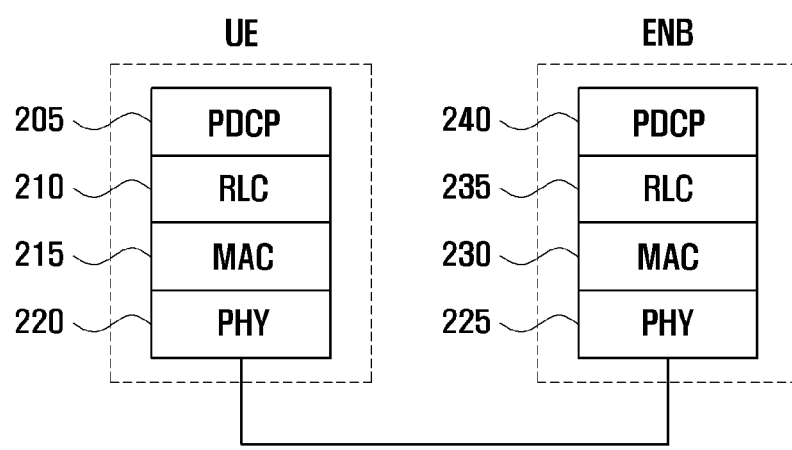
FIG. 2 illustrates a hierarchy of wireless protocols in the LTE system to which the present invention is applied.

FIG. 2 illustrates a hierarchy of wireless protocols in the LTE system to which the present invention is applied.

With reference to FIG. 2, in the LTE system, a UE and an ENB each include a wireless protocol stack composed of PDCP (Packet Data Convergence Protocol) 205 or 240, RLC (Radio Link Control) 210 or 235, and MAC (Medium Access Control) 215 or 230. The PDCP 205 or 240 performs compression and decompression of IP headers. The RLC 210 or 235 reconfigures PDCP PDUs (Protocol Data Unit) to a suitable size and performs ARQ operation. The MAC 215 or 230 is connected with multiple RLC layer entities in a UE. The MAC 215 or 230 multiplexes RLC PDUs into MAC PDUs and demultiplexes MAC PDUs into RLC PDUs. The physical (PHY) layer 220 or 225 converts higher layer data into OFDM symbols by means of channel coding and modulation and transmits the OFDM symbols through a wireless channel. The PHY layer 220 or 225 converts OFDM symbols received through a wireless channel into higher layer data by means of demodulation and channel decoding and forwards the data to higher layers.

Figure 3:
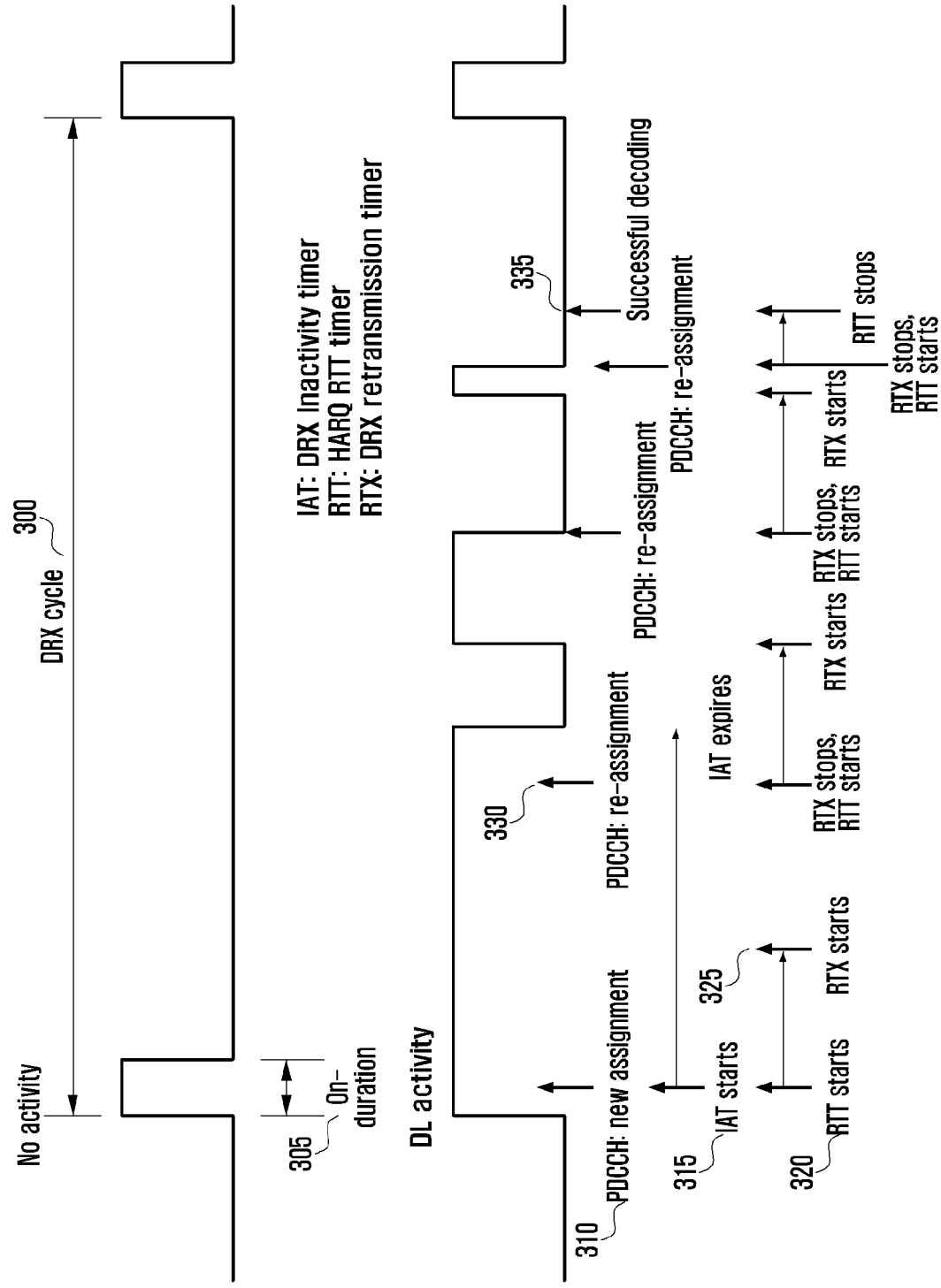
FIG. 3 depicts DRX operation according to the present invention.

FIG. 3 depicts discontinuous reception (DRX) operation performed by the electronic device to reduce power consumption according to the present invention. DRX is a technique that is applied to minimize power consumption in the UE by monitoring only a preset physical downlink control channel (PDCCH) to obtain scheduling information. DRX can operate in both idle mode and connected mode, and DRX operations may be different in each mode.

For example, in connected mode, continuous monitoring of the PDCCH may cause the UE wishing to acquire scheduling information to consume a significant amount of power. Thus, as a basic DRX operation, the electronic device (e.g. UE) may have a DRX cycle 300 and may monitor the PDCCH during the on-duration period 305 only. In connected mode, the DRX cycle can be configured as a long DRX cycle and a short DRX cycle. The long DRX cycle is applied in most cases, and the base station can trigger the short DRX cycle using a MAC control element (CE) if necessary. After a given period of time, the UE may transition from the short DRX cycle to the long DRX cycle.

Initial scheduling information for a specific UE is provided only on a preset PDCCH. Hence, the UE can periodically monitor the PDCCH to minimize power consumption. If scheduling information for a new packet is received on the PDCCH during the on-duration period 305 (310), the UE starts the DRX inactivity timer (IAT) (315). The UE remains active while the DRX inactivity timer is running. That is, PDCCH monitoring is continued.

The UE also starts the HARQ RTT timer (RTT) (320). The HARQ RTT timer is applied to prevent the UE from unnecessarily monitoring the PDCCH during the HARQ round trip time (RTT). The UE does not have to perform PDCCH monitoring while the HARQ RTT timer is running.

However, while the DRX inactivity timer and the HARQ RTT timer are running simultaneously, the UE continues to monitor the PDCCH according to the DRX inactivity timer. When the HARQ RTT timer expires, the DRX retransmission timer (RTX) is started (325). While the DRX retransmission timer is running, the UE has to perform PDCCH monitoring. While the DRX retransmission timer is running, scheduling information for HARQ retransmission may be received (330). Upon receiving the scheduling information, the UE immediately stops the DRX retransmission timer and starts the HARQ RTT timer again. The UE may continue the above process until the packet is successfully received (335).

Meanwhile, in connected mode, configuration information related to the DRX operation is transmitted to the UE through the RRCConnectionReconfiguration message. The on-duration timer, the DRX inactivity timer, and the DRX retransmission timer are defined in terms of the number of PDCCH subframes. After the timer starts, when a preset number of subframes configured a PDCCH subframe have passed, the timer expires. In frequency division duplex (FDD), all downlink subframes correspond to PDCCH subframes, and in time division duplex (TDD), downlink subframes and special subframes correspond to PDCCH subframes. In TDD, downlink subframes, uplink subframes, and special subframes are present in the same frequency band. Among them, the downlink subframes and the special subframes are regarded as PDCCH subframes.

Figure 4:
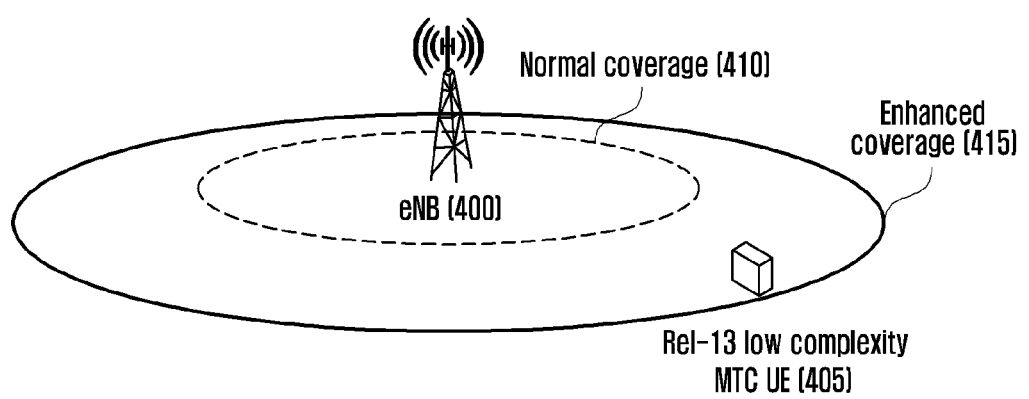
FIG. 4 illustrates two different coverage areas applied to MTC devices according to the present invention.

FIG. 4 illustrates two different coverage areas applied to electronic devices (e.g. MTC UEs) according to the present invention. A base station (e.g. eNB 400) supporting MTC devices may have to support, for example, two types of coverage areas. For example, a MTC UE 405 may be installed in the normal coverage 410. The MTC UE 405 may also be installed in the outside of the normal coverage 410 (e.g. in a basement). This may be referred to as the enhanced coverage 415. In addition, as the MTC UE 405 uses a single antenna and a low-cost receiver, reception performance thereof may be lower compared with a regular UE. To transmit and receive data to and from the MTC UE 405, the existing normal coverage may need to be extended.

The coverage area for the MTC UE 405 may be extended through repetitive transmission and reception. For example, the base station may repeatedly transmit data to be delivered to the MTC UE 405 or regular UE requiring the enhanced coverage. The MTC UE 405 may also repeatedly receive data to accumulate the bit energy of the received data and successfully decode the data through soft combining. Hence, the characteristics of transmission and reception operations are varied depending on whether the normal coverage 410 or the enhanced coverage 415 is applied to the MTC UE 405. In various embodiments of the present invention, it can be assumed that signals exchanged between electronic devices are repeatedly transmitted in the enhanced coverage area.

Figure 5:
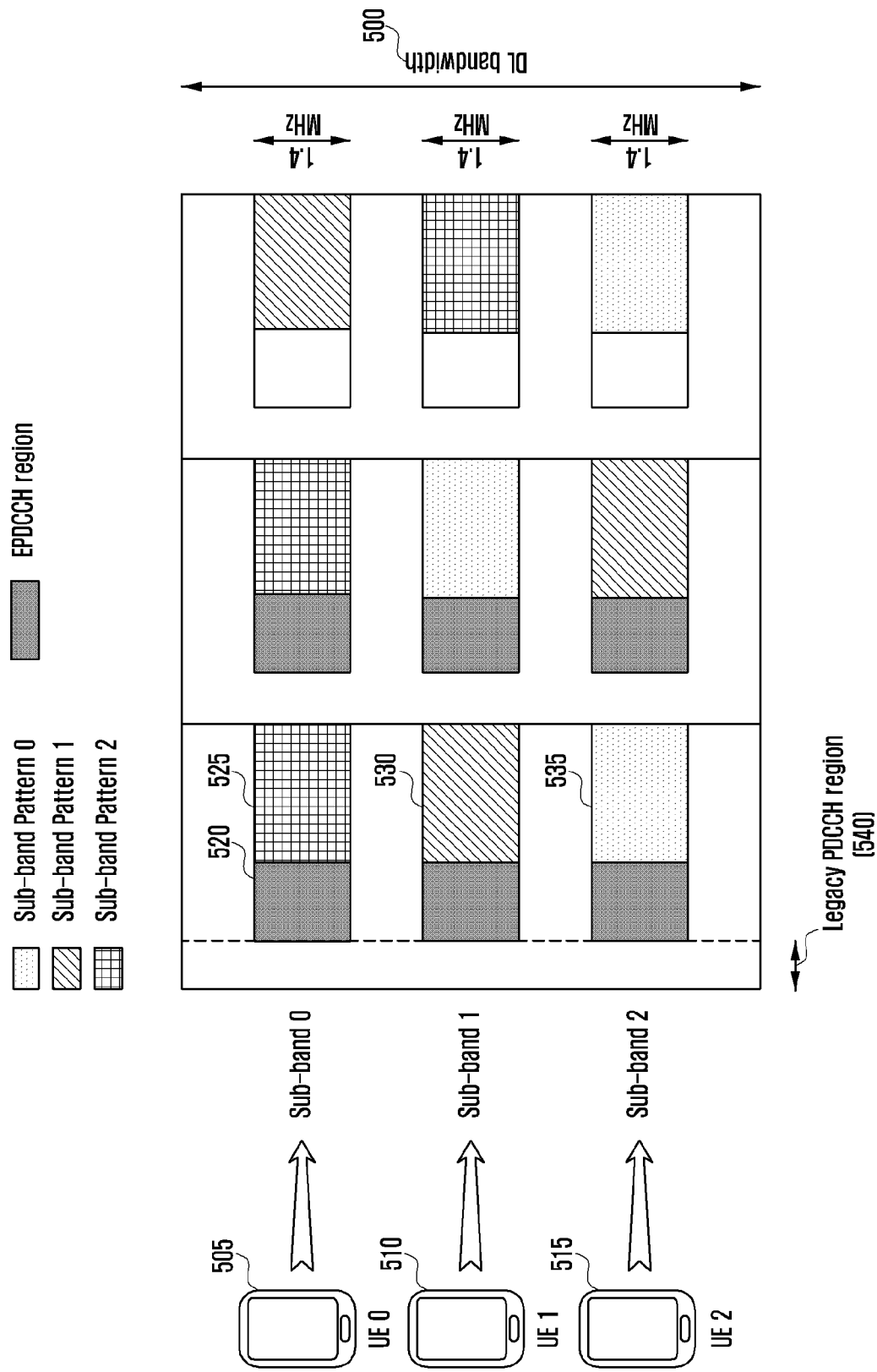
FIG. 5 illustrates the sub-band and EPDCCH used by each MTC device for access according to the present invention.

FIG. 5 illustrates the sub-band and enhanced PDCCH (EPDCCH) used by each electronic device (e.g. MTC device) for access according to the present invention. The MTC device may use a limited frequency band of 1.4 MHz width. The MTC device may hop among the 1.4 MHz frequency bands. When a plurality of 1.4 MHz frequency bands (e.g. sub-bands 0 to 2 as indicated by indicia 525, 530 and 535) exist within the downlink bandwidth 500, multiple EPDCCH radio resources 520 may be present. The MTC device using a 1.4 MHz frequency band cannot receive the PDCCH 540 transmitted in a wider downlink frequency band. Hence, a new control channel is required to transmit scheduling information in place of the PDCCH. The EPDCCH is a control channel that serves as the PDCCH while being transmitted in the existing PDSCH region. Scheduling information for the MTC device can be provided through the EPDCCH. Here, each MTC device (e.g. MTC UE 505, 510 or 515) may determine the EPDCCH associated with one of the sub-bands. To distribute the load of the sub-band, each MTC UE 505, 510 or 515 may randomly select one of the sub-band.

Figure 6:
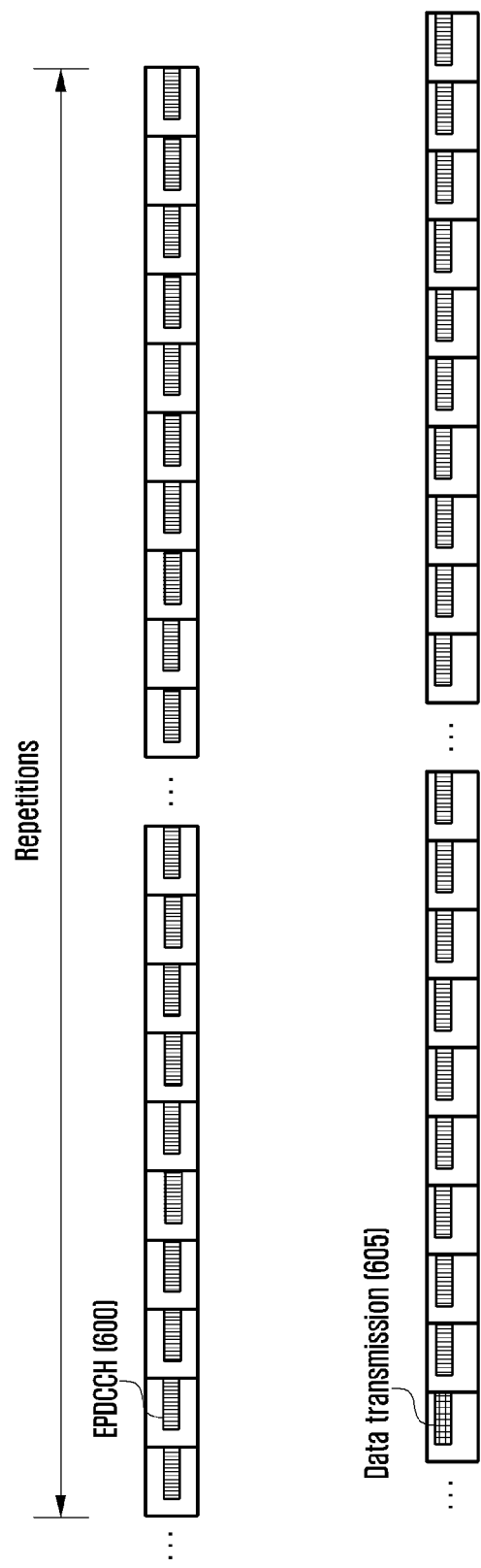
FIG. 6 illustrates the EPDCCH and data retransmission to extend the coverage area for MC devices according to the present invention.

FIG. 6 illustrates the EPDCCH and data retransmission to extend the coverage area for MTC devices according to the present invention. MTC devices require an extended coverage area for various reasons, for example, degradation reception performance due to single antenna and low cost receiver, and installation in the outside of the existing coverage area. To support this, the base station repeatedly transmits various control information and regular data for communication. The MTC device can soft-combine repeatedly transmitted signals so as to receive the desired signal even at a considerable distance beyond the existing coverage area. For example, the MTC device may repeatedly receive the EPDDCH 600 including scheduling information. The MTC device soft-combines the repeatedly received EPDCCH to perform decoding. The MTC device may receive the corresponding data 605 using the obtained scheduling information. The data will also be repeatedly transmitted. Although not shown, the signal from the MTC device to the base station may also be repeatedly transmitted for the same reason.

Figure 7:
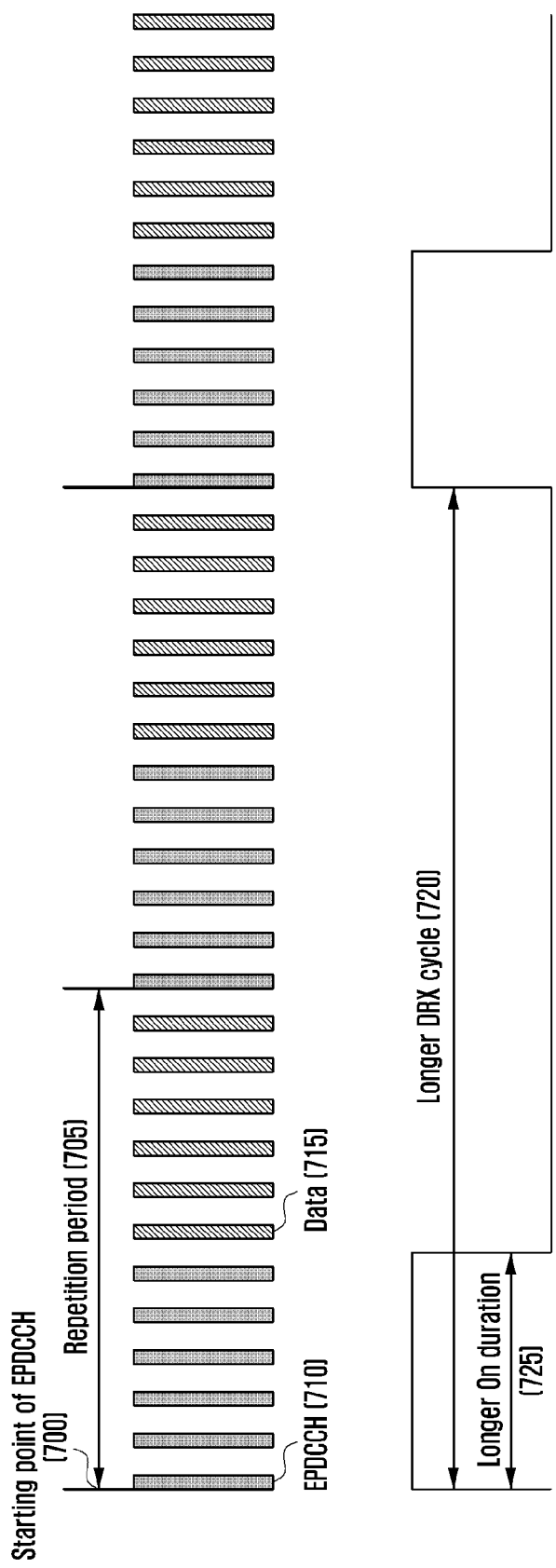
FIG. 7 illustrates association between the repetition period for the EPDCCH and the DRX cycle according to the present invention.

FIG. 7 illustrates association between the repetition period for the EPDCCH and the DRX cycle according to the present invention.

Even when repeated signal transmission is applied, the UE still needs to save power consumption as much as possible, so that the DRX concept can be applied. To efficiently manage repetitive transmissions, repeated transmissions will begin at a specific timing 700. That is, repeated transmission of the EPDCCH starts at a preset timing, and then the data 715 indicated by the EPDCCH will be repeatedly transmitted. When the repeated transmission of the EPDCCH and data is completed, a new EPDCCH and data are repeatedly transmitted in sequence. Hence, there is a repetition period 705 for the EPDCCH with a given size between the start of the previous EPDCCH and the start of the new EPDCCH.

The new DRX cycle 720 applied to the MTC device may be determined in accordance with the above repetition period. The MTC device should wake up every DRX cycle to acquire the EPDCCH. If the DRX cycle is not determined in accordance with the repetition period, the MTC device will wake up in a time period during which the EPDCCH is not transmitted and attempt to receive the EPDCCH. That is, the new DRX cycle should be set to a multiple of the EPDCCH repetition period. As the number of repeated transmissions of the EPDCCH is very large (e.g. 20 to 200), the repetition period for the EPDCCH can be long accordingly. This means that the maximum of the DRX cycle should also be increased. Since the maximum of the DRX cycle is limited by the system frame number (SFN) cycle, if a very long DRX cycle of 10.24 seconds or more is required, the SFN cycle should also be increased. To this end, an additional SFN bit may be provided to the UE.

When the DRX cycle arrives, the MTC device should wake up to receive the repeatedly transmitted EPDCCH. This should be done within the on-duration period 725. Also for the above reasons, the on-duration period should be increased. Specifically, the extended on-duration period should be long enough for the MTC device to receive all repeated transmissions for at least one EPDCCH. For example, if the EPDCCH is repeatedly transmitted every subframe (1 ms) in 40 consecutive subframes, the length of the on-duration period may be set to at least 40 ms.

Figure 8:
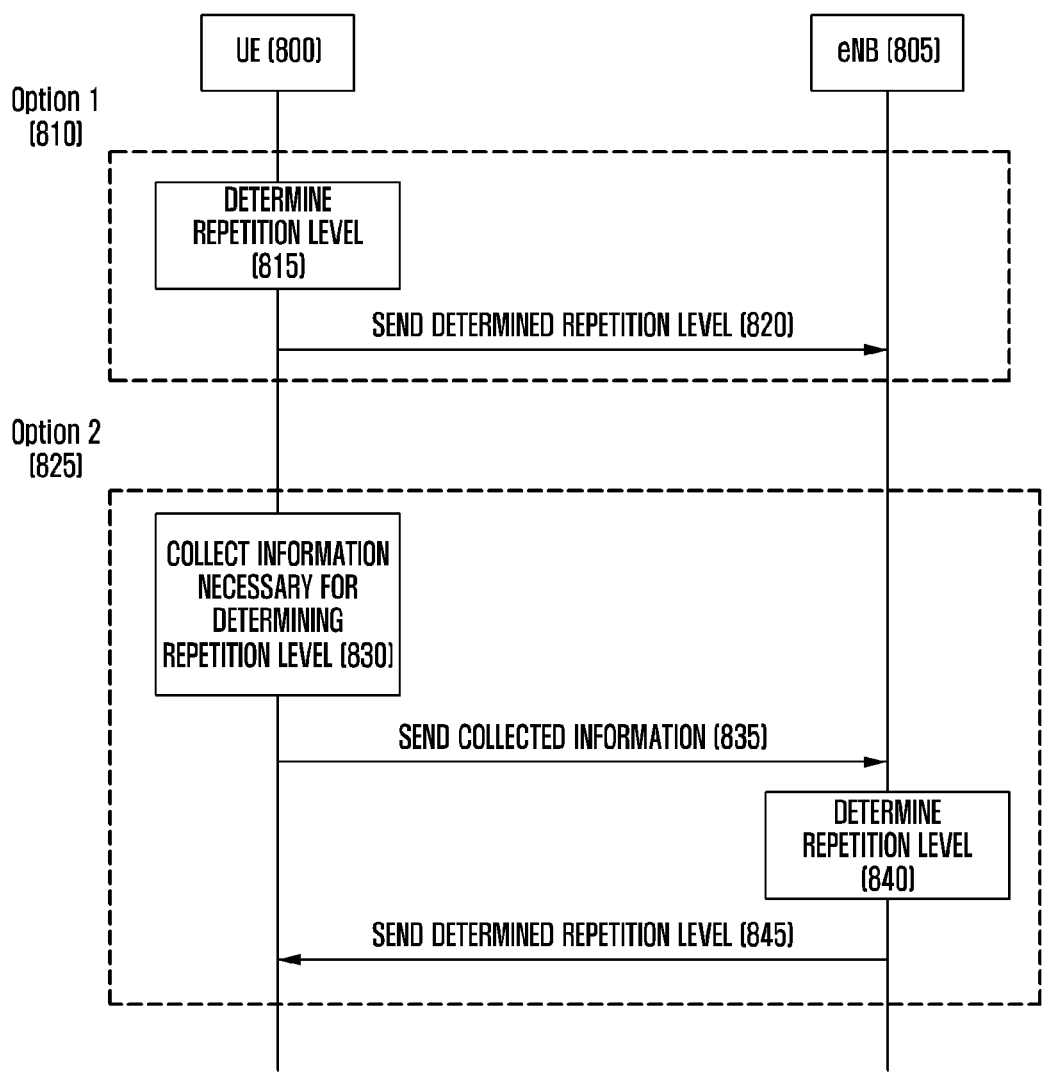
FIG. 8 illustrates a scheme for determining the number of repeated receptions of a signal according to the present invention.

FIG. 8 illustrates a scheme for determining the number of repeated receptions of a signal according to the present invention. Although FIG. 8 illustrates a scheme for determining the number of repeated receptions of a signal to be received by the UE (e.g. MTC device) from the base station, it will be readily apparent to those skilled in the art that a similar approach applies to determining the number of repeated transmissions of a signal to be sent by the UE to the base station.

In various embodiments, as a first option 810, the UE 800 may determine the repetition count (e.g., the number of repeated receptions of a signal, or the number of repeated transmissions of a signal), and report the determined repetition count to the eNB 805. As a second option 825, the UE 800 may collect information necessary for determining the repetition count and report the collected information to the eNB 805, and the eNB 805 may determine the repetition count based on the information. The repetition count may be equally applied to data and messages (e.g. control messages containing control information), or may be differently applied to data and messages of different types. For example, the number of repetitions of the EPDCCH may be identical to or different from that of regular data. Specifically, the number of repetitions of the EPDCCH may be different from that of data since the level of overcoming the channel error changes depending on the coding rate and modulation scheme applied to the EPDCCH and data. For similar reasons, more repetitions can be applied to vulnerable channels or messages.

In the first option 810, at step 815, the UE 800 may collect information necessary for determining the repetition count and determine the repetition count according to a preset rule. The repetition count may be determined in various ways. For example, 1) In the case of LTE technology, the repetition count may be determined on the basis of RSRP (reference signal received power) and RSRQ (reference signal received quality), which are the most representative indexes reflecting channel conditions (channel state information). The indexes may be measured for a preset or signaled measurement interval, and the required repetition count may be determined with respect to at least one channel state threshold.

2) The required repetition count may be set to the number of repeated transmissions of the preamble until successful access in the previous random access.

3) The required repetition count may be set to the number of repeated receptions of the previous system information (e.g. MIB, SIB1, SIB2) until successful reception.

Rather than supporting the required repetition count directly, it is possible to use the repetition level corresponding to a specific number of repetitions. For example, repetition level 1 can be mapped to a repetition count of 200 (200 repetitions), and repetition level 2 can be mapped to a repetition count of 300 (300 repetitions). If the required number of repetitions is calculated to be about 250 based on the measured RSRP or RSRQ value, the UE may select repetition level 2. The reason for introducing such a level is that it is difficult to support various repetition counts in the actual system. For example, to accurately notify the receiver side of various repetition counts, the number of signaling bits should be increased, causing an increase in complexity.

In LTE technology, a plurality of UEs should be served at the same time. Hence, in one embodiment of the present invention, it is preferable to control UEs having the same repetition level as a group in accordance with the repetition period for transmission and reception.

At step 820, the UE 800 may report the determined repetition level to the eNB 805.

In the second option 825, at step 830, the UE 800 may collect information necessary for determining the repetition count (e.g. repetition level). As described above in the first option, such information may include at least one of, for example, channel state information, information on the number of repeated transmissions of the preamble, and information on the number of repeated receptions of the system information. At step 835, to determine the repetition level for the UE 800, the eNB 805 may receive a report of the collected information from the UE 800.

Alternatively, the eNB 805 may directly collect such information. If the required repetition count is set to the number of repeated transmissions of the preamble until successful access in the previous random access, the eNB 805 may not need to receive the above information from the UE 800. At step 840, the eNB 805 may determine the repetition level for the UE 800 on the basis of the received information. At step 845, the eNB 805 may notify the UE 800 of the determined repetition level.

Figure 9:
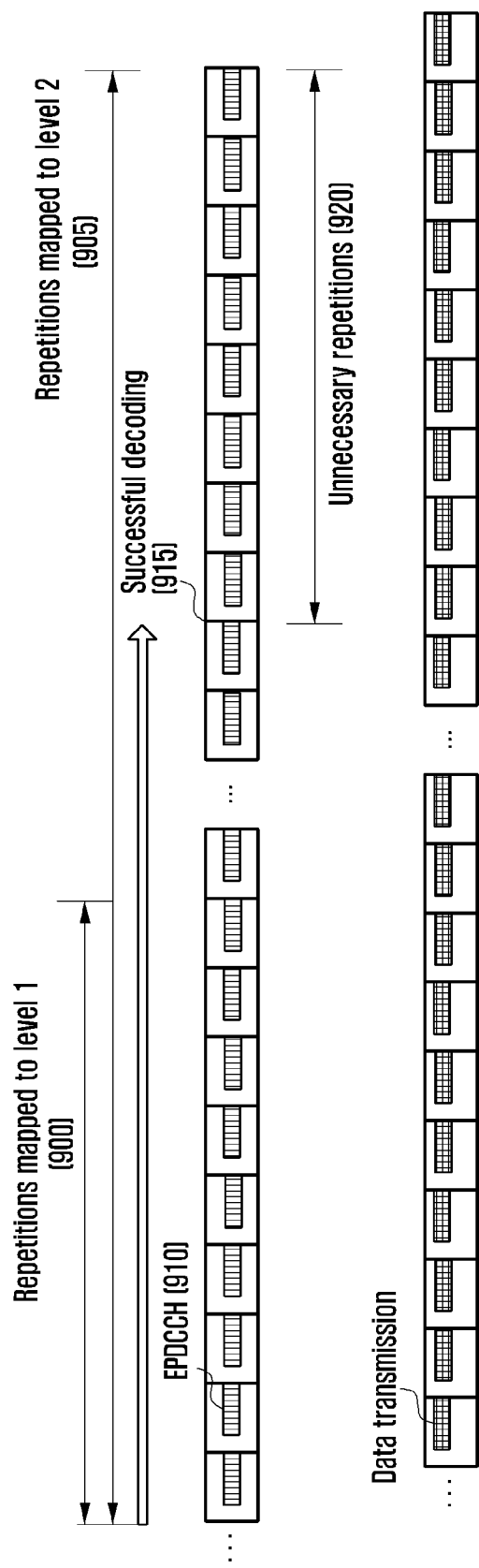
FIG. 9 illustrates causes of power consumption in a user equipment according to the present invention.

FIG. 9 illustrates causes of power consumption in a user equipment (e.g. MTC device) according to the present invention. For ease of description, it is assumed that the UE repeatedly receives the EPDCCH 910 from the base station. As described before, the number of repeated receptions (915) actually required for the UE to successfully decode the EPDCCH will be less than or equal to the repetition count mapped to the set repetition level. When it is assumed that the repetition count determined based on a preset rule such as RSRP or RSRQ is greater than the number of repetitions mapped to repetition level 1 (900) and less than the number of repetitions mapped to repetition level 2 (905), the base station and the UE may apply repetition level 2. If the UE can perform soft combining before the number of repetitions mapped to repetition level 2 is reached, the UE will be able to successfully decode the EPDCCH (915) before the number of repetitions mapped to repetition level 2 is reached.

Once the EPDCCH is acquired, it is preferable that the UE no longer receives the repeatedly transmitted EPDCCH. As the duration of not receiving the EPDCCH (920) may be not relatively short, the UE may significantly reduce power consumption by stopping the reception operation.

For example, in the LTE standards, the total repetition levels for the physical random access channel (PRACH) is determined to be four (level 0 for no repetition), and the maximum number of repeated transmissions required for system information is analyzed up to 300. On the basis of these results, assuming that the number of repetitions between repetition levels is, for example, 100, the number of unnecessary receptions will not be small. Therefore, in various embodiments, for reducing power consumption of the UE, it is advantageous for the UE to attempt decoding before the number of repetitions mapped to repetition level 2 is reached. In particular for MTC devices, reducing power consumption is very important and this can have a more significant meaning.

However, it cannot be certain at which point the UE will succeed in decoding. Be that as it may, continuous decoding on every subframe including the EPDCCH may be another cause of power consumption. Accordingly, various embodiments of the present invention propose a method for determining the decoding time and decoding period so that the UE may perform decoding before the number of repetitions mapped to the applied repetition level is reached. According to various embodiments of the present invention (to be described in detail later), the decoding start point and decoding period may be determined in consideration of at least one of the factor for determining the number of repeated transmissions (e.g. channel state information), the type of a message to be acquired, and the error in determining the number of repeated transmissions. Although the following description focuses on the terminal operation when the receiving end is a terminal (e.g. MTC device), it is apparent that the same also applies to a base station when the receiving end is the base station.

Figure 10:
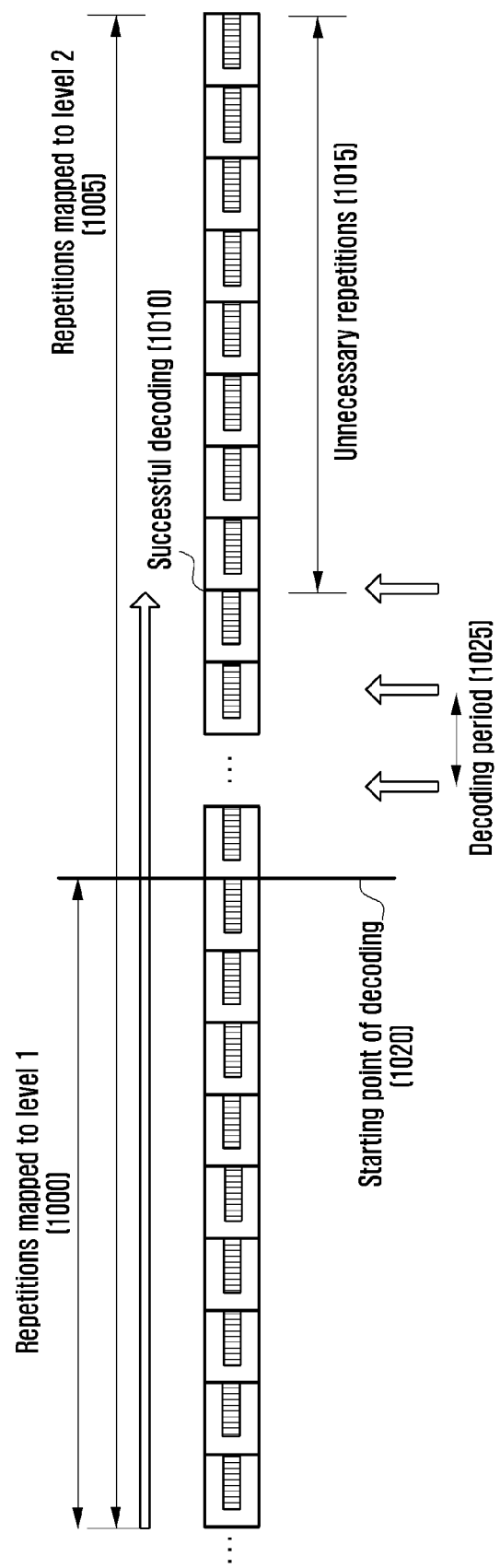
FIG. 10 depicts a scheme for determining the decoding start point and decoding period according to an embodiment of the present invention.

FIG. 10 depicts a scheme for determining the decoding start point and decoding period according to an embodiment of the present invention.

In this embodiment, the decoding start point 1020 is determined on the basis of the end point 1020 of the repetitions corresponding to a preset repetition level lower than (e.g. one level) the applied repetition 005. The reason is that, when the base station or the UE determines one repetition level, the required repetition count 1010 (i.e. the number of repetitions leading to successful decoding) is greater than the repetition count corresponding to a repetition level immediately lower than the applied repetition level and is less than or equal to the repetition count corresponding to the applied repetition level.

If there is little error in determining the number of repeated transmissions, although soft combining is attempted when the number of actual repeated receptions is less than the repetition count corresponding to a repetition level immediately lower than the applied repetition level, the probability of successful decoding will be extremely low. Hence, it is preferable that the decoding start point 1020 is determined on the basis of the end point of the repetitions corresponding to a repetition level at least one level lower than the applied repetition level. The UE may attempt decoding with respect to the decoding start point 1020.

Although decoding is attempted from the end point of the repetitions corresponding to a repetition level immediately lower than the applied repetition level, it is still inefficient to attempt decoding at every subframe in which a signal (e.g.

EPDCCH) is transmitted. As described before, since the difference in the number of repetitions between levels may be very large (e.g. more than 100), it is undesirable to attempt decoding at every subframe. Hence, in one embodiment, a decoding period 1025 may be defined so that decoding can be attempted in each period. The decoding period may be determined in consideration of at least one of the factor for determining the number of repeated transmissions (e.g. channel state information), the type of a message to be acquired, and the error in determining the number of repeated transmissions.

According to an embodiment of the present invention, if decoding is successful (1010), the UE may no longer repeatedly receive the signal thereafter (1015).

Figure 11:
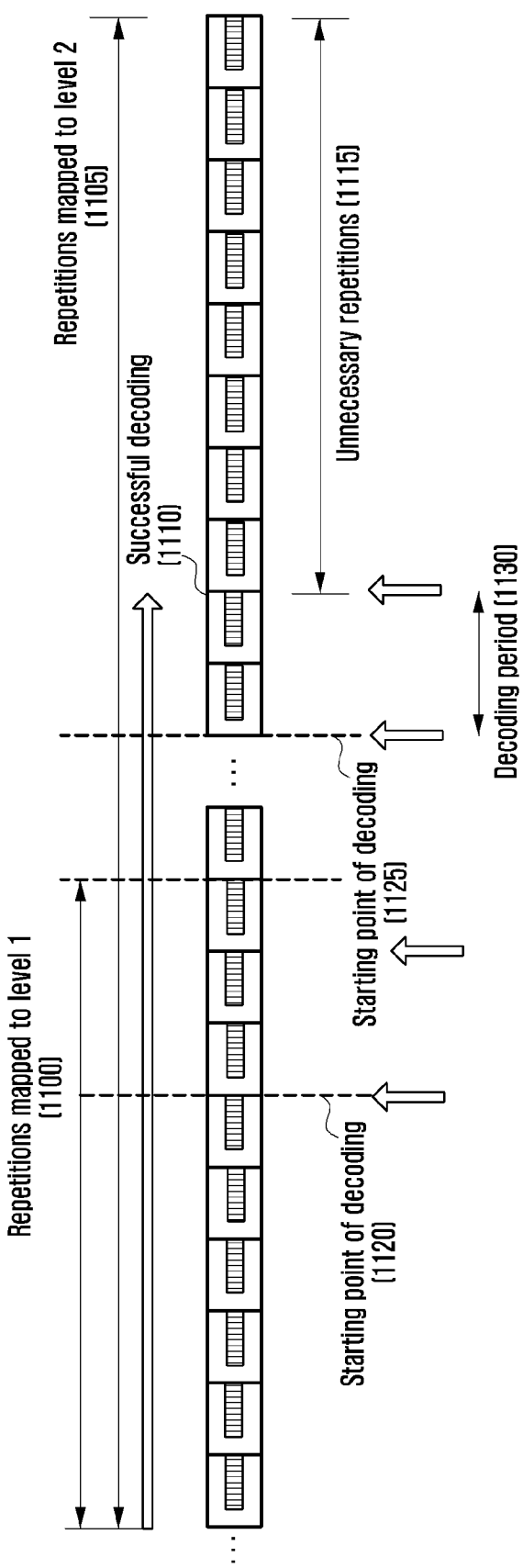
FIG. 11 depicts a scheme for determining the decoding start point and decoding period according to another embodiment of the present invention.

FIG. 11 depicts a scheme for determining the decoding start point and decoding period according to another embodiment of the present invention.

In this embodiment, the decoding start point 1120 is determined in consideration of at least one of the factor for determining the number of repeated transmissions (e.g. channel state information), the type of a message to be acquired, and the error in determining the number of repeated transmissions.

The repetition count 1110 required by the base station or the UE (i.e. the number of repetitions leading to successful decoding) is greater than the repetition count 1100 corresponding to a repetition level lower than the applied repetition level by a given level (e.g. one level) and is less than or equal to the repetition count 1105 corresponding to the applied repetition level. However, there may be an error in the repetition count 1110 derived by the base station or the UE using various indicators. A major cause of such an error is the movement of the UE. After the UE has derived the required repetition count at a location where the channel condition is poor, when the UE is moved to a location where the channel condition is acceptable, the repetition count actually needed (i.e. the number of repetitions leading to successful decoding) may be less than the derived repetition count. Hence, although soft combining is attempted when the number of actual repeated receptions is less than the repetition count corresponding to a repetition level immediately lower than the applied repetition level, the probability of successful decoding still exists. This indicates that, in consideration of an error occurrence, it is necessary to set the decoding start point 1120 to a time point earlier than the end point of the repetitions corresponding to a repetition level immediately lower than the applied repetition level.

For example, after determining the repetition level, upon determining that the UE is still moving at high speed and the channel condition is gradually improving, decoding may be started earlier (1120). In this case, the UE can acquire data early and stop the repeated reception early, thereby reducing power consumption. In reverse, upon determining that the UE is still moving at high speed and the channel condition is gradually deteriorating, decoding may be started later (1125). In this case, it is possible to prevent the UE from unnecessarily attempting to decode in a situation where the probability of successful decoding is low.

As an example, the type of a message to be acquired may affect the decoding start point. The message may include a signal (e.g. data or control information). For example, among the messages exchanged between the base station and the UE in the LTE system, there are urgent messages, such as emergency calls, and disaster alarms (e.g. ETWS, CMAS). It is desirable that these messages are known to the user as soon as possible. Hence, if the message to be received is of such type, decoding may be attempted in advance from a point corresponding to the message type. To receive a message of such type, if there is a small probability of decoding success, decoding may be started from that point in time. To receive a message of such type, the decoding period 1130 can also be set shorter. In various embodiments, the message type can also be used as a measure to determine whether to apply the decoding start point and decoding period. For example, in one embodiment, when the message type is one of preset types, decoding may be performed by applying the decoding start point and decoding period.

As another example, the factor for determining the number of repeated transmissions (e.g. channel state information) may affect the decoding start point. For example, assume that the repetition level is determined using RSRP or RSRQ among the channel status information. After measuring RSRP or RSRQ of the common reference signal (CRS), the base station or the UE may determine a suitable repetition level by using, for example, the following rule. UE-specific RS or MTC-specific RS may be used instead of the CRS.

If CRS quality (e.g. RSRP)<threshold A, repetition level 3

If threshold A<CRS quality<threshold B, repetition level 2

If threshold B<CRS quality, repetition level 1

Here, the threshold value means a channel state threshold value for distinguishing the repetition level, and threshold A is less than threshold B. In one embodiment, the CRS quality may be used to determine the decoding time. For example, assume that repetition level 2 is determined as the CRS quality is greater than threshold A and less than threshold B. The CRS quality may be closer to threshold B than threshold A, or vice versa. If the CRS quality is closer to threshold A, the decoding time may start at a point near repetition level 2. Otherwise, if the CRS quality is closer to threshold B, the decoding time may start at a point near repetition level 1. That is, in one embodiment, the decoding start point may be determined in consideration of the difference between the channel state information and the at least one channel state threshold value.

According to an embodiment of the present invention, if decoding is successful (1110), the UE may no longer repeatedly receive the signal thereafter (1115).

Figure 12:
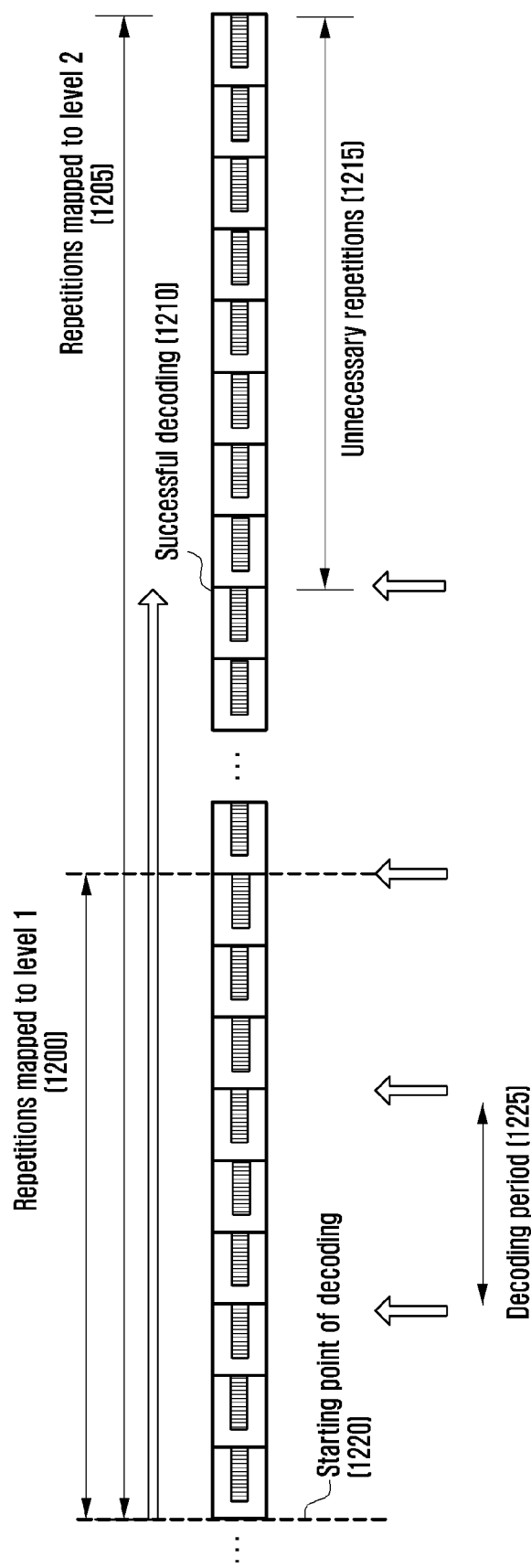
FIG. 12 depicts a scheme for determining the decoding start point and decoding period according to another embodiment of the present invention.

FIG. 12 depicts a scheme for determining the decoding start point and decoding period according to another embodiment of the present invention.

In this embodiment, the decoding start point 1220 may be fixed to the point at which the repeated transmission starts depending on the situation. For example, the repetition count 1210 required by the UE (i.e. the number of repetitions leading to successful decoding) is greater than the repetition count 1200 corresponding to a repetition level immediately lower than the applied repetition level and is less than or equal to the repetition count 1205 corresponding to the applied repetition level. However, if the UE moves and the channel condition rapidly improves, the UE may start decoding from the start of the repeated transmission (1220). In addition, the decoding period 1225 may be set somewhat longer in order to reduce the load due to decoding. As described before, for urgent messages such as emergency calls and emergency alarms (e.g. ETWS, CMAS), decoding can be started from the point at which the repeated transmission starts (1220) so that information can be obtained as soon as possible.

According to an embodiment of the present invention, if decoding is successful (1210), the UE may no longer repeatedly receive the signal thereafter (1215).

Figure 13:
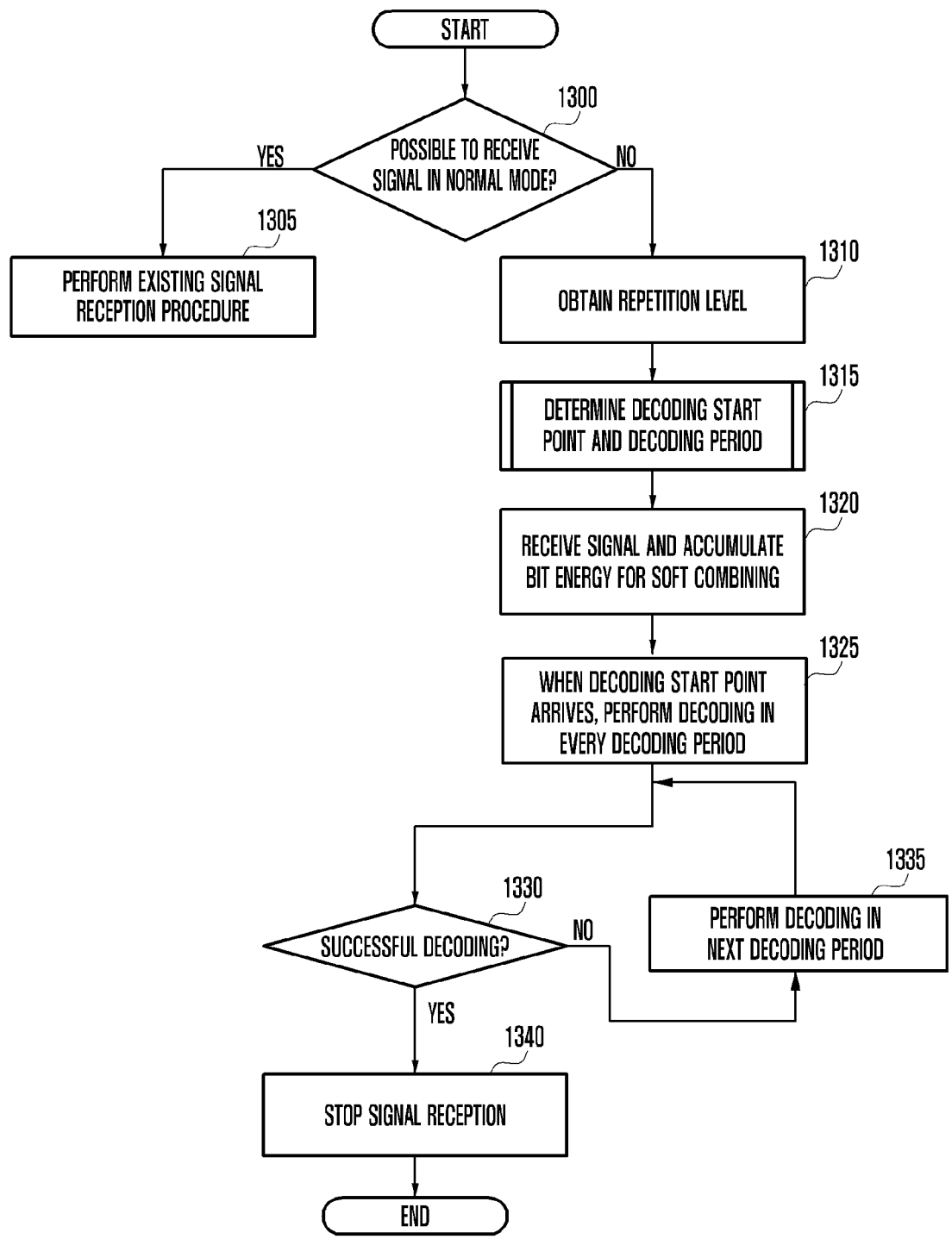
FIG. 13 is a flowchart illustrating operations for signal reception and processing in the electronic device according to various embodiments of the present invention.

FIG. 13 is a flowchart illustrating operations for signal reception and processing in the electronic device (e.g. terminal or base station) according to various embodiments of the present invention.

At step 1300, the electronic device may determine whether it is possible to receive a signal in normal mode (e.g. using the normal coverage area) or in enhanced mode (e.g. using the enhanced coverage area).

Upon determining that it is possible to receive a signal in normal mode, at step 1305, the electronic device performs the existing procedure for signal reception and processing.

Otherwise, upon determining that it is necessary to receive a signal in enhanced mode, at step 1310, the electronic device may obtain the repetition level. As described before with reference to FIG. 8, the repetition level is determined by the base station or the terminal, and both the base station and the terminal should be aware of the determined repetition level. To this end, there may be additional signaling between the base station and the terminal.

At step 1315, the electronic device may determine the decoding start point and decoding period in various manners. Based on the various embodiments previously described in FIGS. 9 to 11, the electronic device may determine the decoding start point and decoding period. Determining the decoding start point at this step will be described in detail later with reference to FIGS. 14 to 18.

At step 1320, the electronic device may accumulate bit energy for soft combining by receiving repeatedly transmitted data.

At step 1325, when the decoding start point arrives, the electronic device may perform decoding in every decoding period.

At step 1330, the electronic device may determine whether decoding is successful.

If decoding is successful, at step 1340, the electronic device may stop receiving the signal to minimize power consumption. In addition, the terminal can suspend the operation of the RF module and the modem until the repeated transmission of the next signal starts. If decoding is unsuccessful, at step 1335, the electronic device may perform decoding in the next decoding period. Thereafter, the procedure returns to step 1330.

Figure 14:
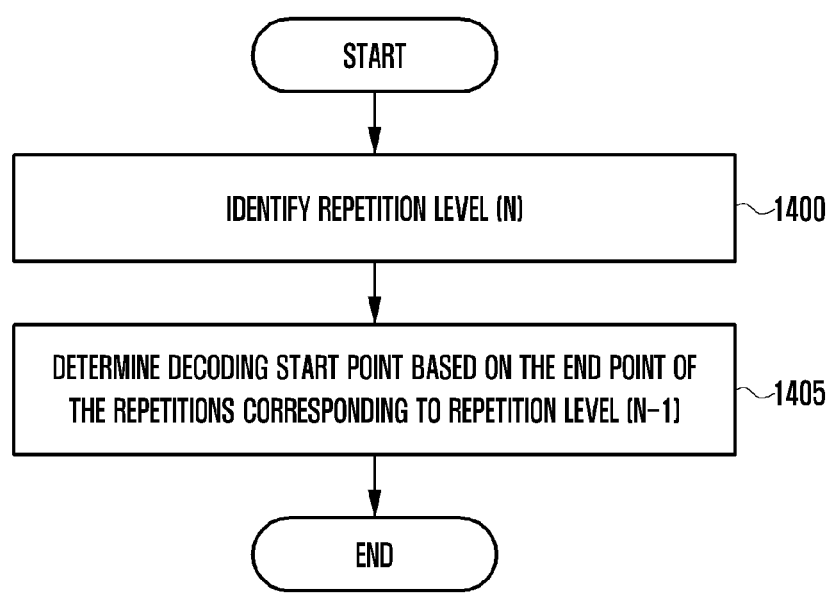
FIG. 14 illustrates a scheme for determining the decoding start point in the electronic device according to an embodiment of the present invention.

FIG. 14 illustrates a scheme for determining the decoding start point in the electronic device according to an embodiment of the present invention.

At step 1400, the electronic device may identify the applied repetition level (N).

At step 1405, the electronic device may determine the decoding start point on the basis of the end point of the repetitions corresponding to a repetition level (N−1) lower than the applied repetition level (N) by a given level (e.g. one level).

Figure 15:
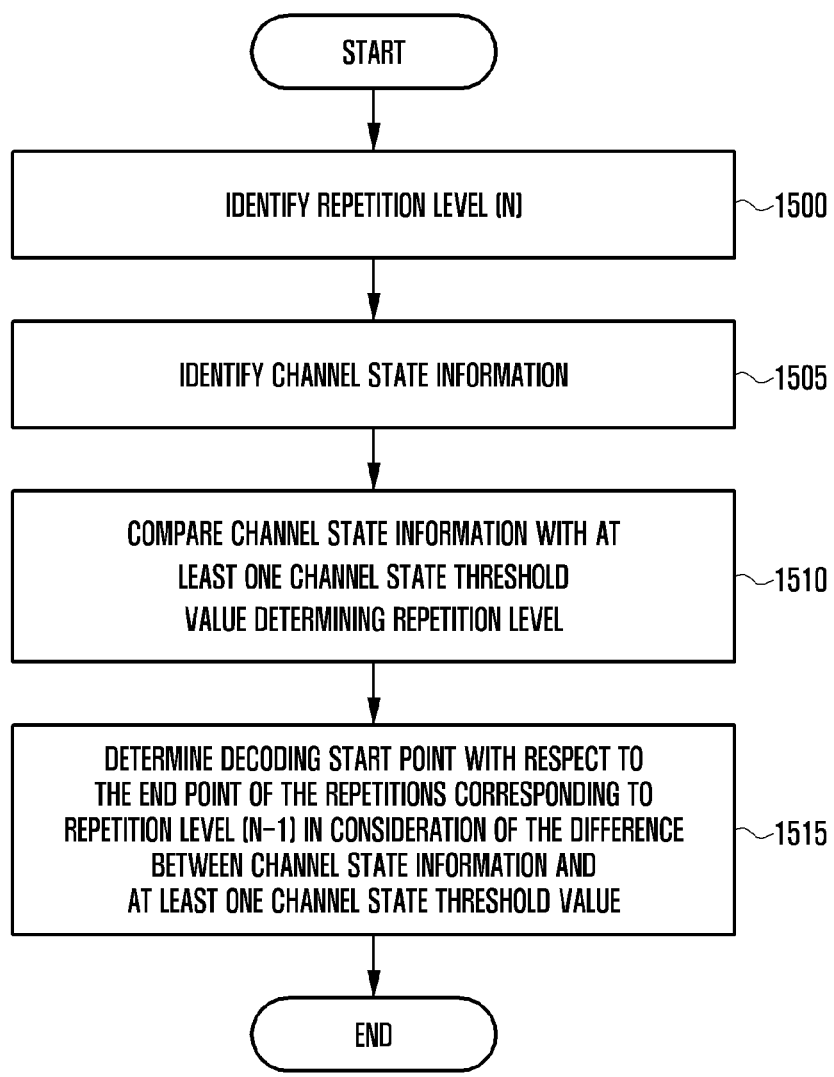
FIG. 15 illustrates a scheme for determining the decoding start point in the electronic device according to another embodiment of the present invention.

FIG. 15 illustrates a scheme for determining the decoding start point in the electronic device according to another embodiment of the present invention. In this embodiment, it is assumed that the applied repetition level is determined based on channel state information. It is assumed that the repetition level is determined by comparing the channel state information with at least one channel state threshold value.

At step 1500, the electronic device may identify the applied repetition level (N).

At step 1505, the electronic device may identify the channel state information (e.g. RSRP or RSRQ). In various embodiments, the channel state information may be information used to determine the repetition level (N), or newly obtained information to determine the decoding start point.

At step 1510, the electronic device may compare the channel state information with at least one channel state threshold value determining the repetition level. The electronic device may identify the difference between the channel state information and the at least one channel state threshold value. For example, when the channel state information exists between threshold A and threshold B (threshold A<threshold B), the electronic device may identify the difference between the channel state information and at least one of threshold A and threshold B.

At step 1515, the electronic device may determine the decoding start point based on the end point of the repetitions corresponding to a repetition level (N−1) lower than the applied repetition level (N) by a given level (e.g. one level) in consideration of the difference between the channel state information and the at least one channel state threshold value. For example, if the channel state information is closer to threshold A, the decoding time may start earlier by a time corresponding to the difference before the end point of the repetitions corresponding to the repetition level N−1. Otherwise, if the channel state information is closer to threshold B, the decoding time may start later by a time corresponding to the difference after the end point of the repetitions corresponding to the repetition level N−1.

Figure 16:
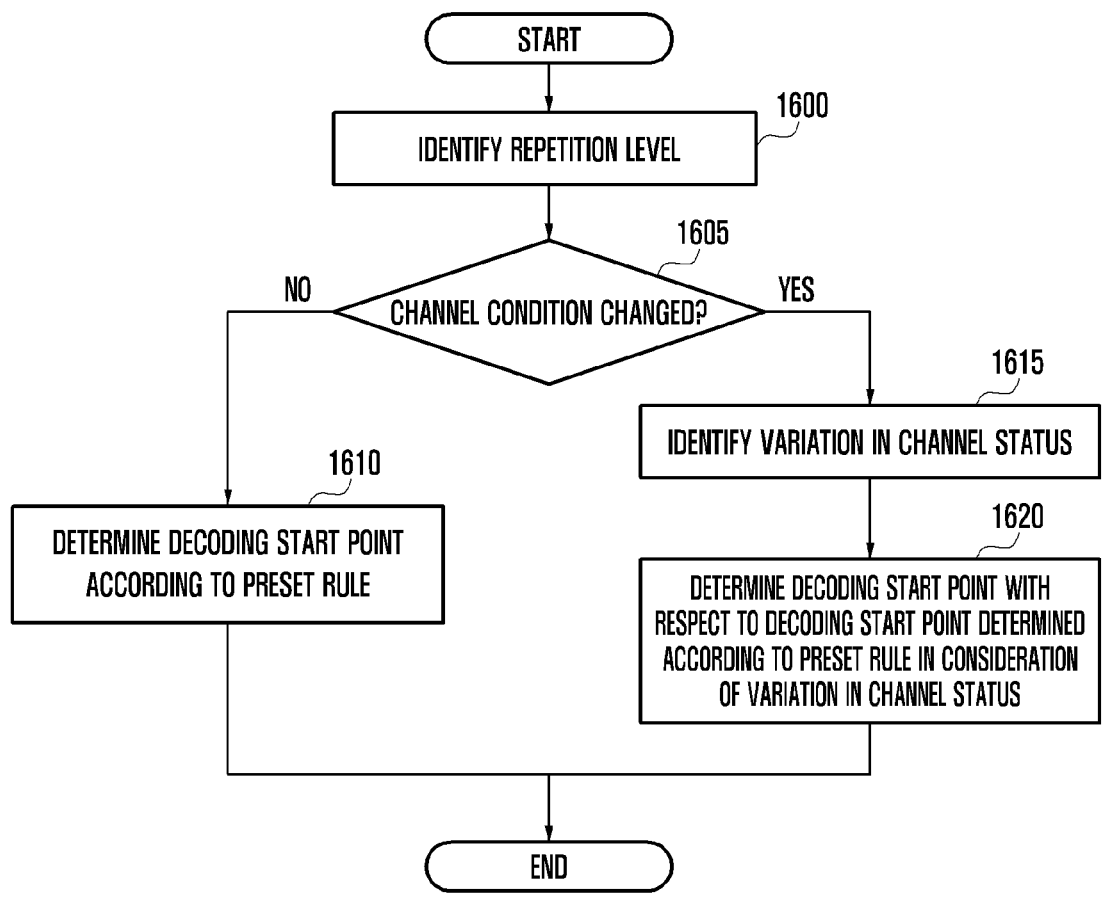
FIG. 16 illustrates a scheme for determining the decoding start point in the electronic device according to another embodiment of the present invention.

FIG. 16 illustrates a scheme for determining the decoding start point in the electronic device according to another embodiment of the present invention.

At step 1600, the electronic device may identify the applied repetition level.

At step 1605, the electronic device may determine whether the channel condition has changed after determining the repetition level. For example, the electronic device may check whether there is a change exceeding a given threshold in RSRP or RSRQ after the repetition level has been determined.

Upon determining that the channel condition has not changed, at step 1610, the electronic device may determine the decoding start point according to a preset rule. The preset rule may include one of the schemes described in FIGS. 14 and 15.

Upon determining that the channel condition has changed, at step 1615, the electronic device may determine the variation in the channel status. Here, the variation in the channel status may indicate the degree of change in the channel condition.

At step 1620, the electronic device may determine the decoding start point with respect to the decoding start point determined according to a preset rule in consideration of the variation in the channel status. For example, if the channel condition is improved, decoding may be started earlier by a time corresponding to the variation before the decoding start point determined according to the preset rule. Otherwise, if the channel condition is deteriorated, decoding may be started later by a time corresponding to the variation after the decoding start point determined according to the preset rule.

Figure 17:
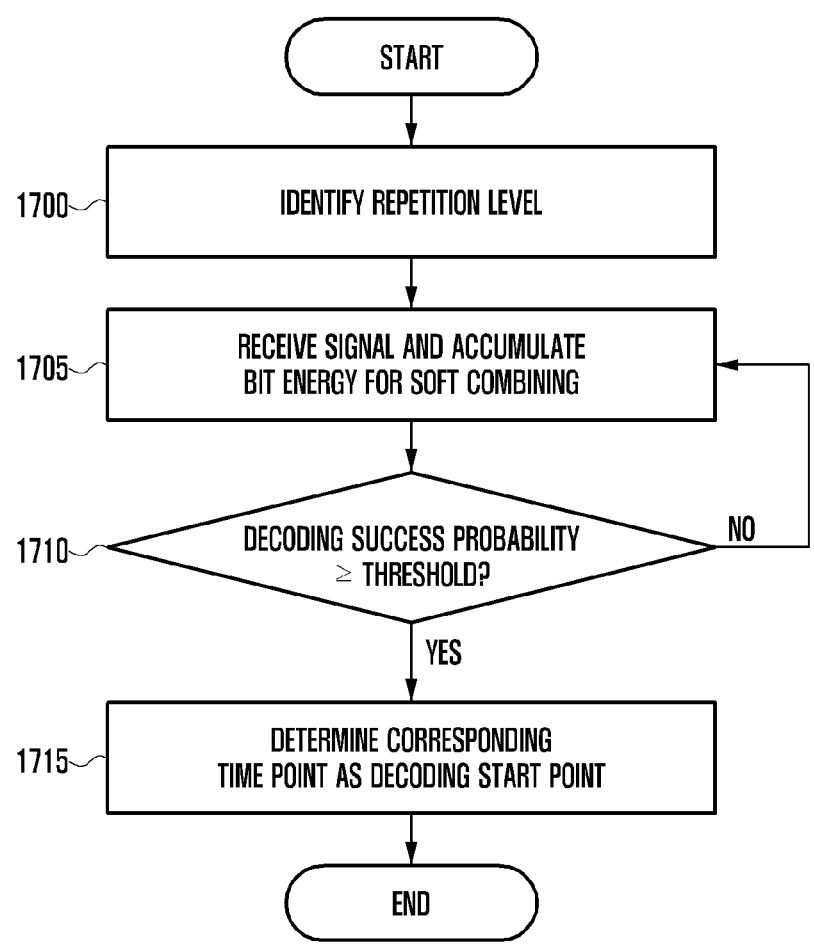
FIG. 17 illustrates a scheme for determining the decoding start point in the electronic device according to another embodiment of the present invention.

FIG. 17 illustrates a scheme for determining the decoding start point in the electronic device according to another embodiment of the present invention.

At step 1700, the electronic device may identify the applied repetition level.

At step 1705, the electronic device may receive a signal and accumulate the bit energy of the received signal for soft combining.

At step 1710, the electronic device may determine whether the decoding success probability exceeds a preset threshold on the basis of the accumulated bit energy. Upon determining that the decoding success probability does not exceed the preset threshold, the electronic device may repeatedly receive a signal to accumulate the bit energy.

Upon determining that the decoding success probability exceeds the preset threshold, at step 1715, the electronic device may determine the decoding start point based on the time point at which the decoding success probability exceeds the threshold. For example, the electronic device may start decoding from the time point at which the decoding success probability exceeds the threshold.

Figure 18:
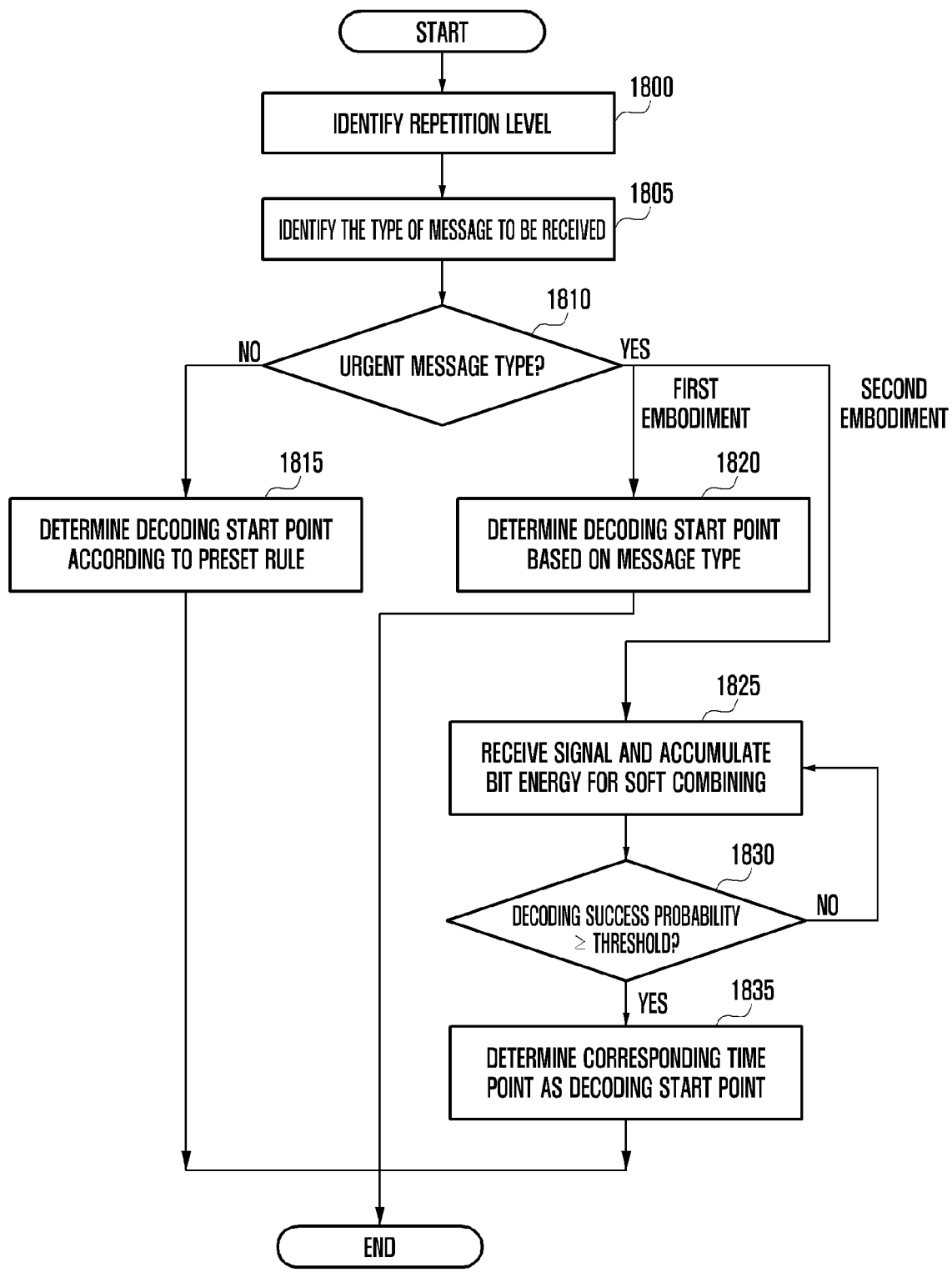
FIG. 18 illustrates a scheme for determining the decoding start point in the electronic device according to another embodiment of the present invention.

FIG. 18 illustrates a scheme for determining the decoding start point in the electronic device according to another embodiment of the present invention.

At step 1800, the electronic device may identify the applied repetition level.

At step 1805, the electronic device may identify the type of a message to be received. The message may include a signal (e.g. data or control information).

At step 1810, the electronic device may determine whether the type of the message to be received is a preset message type (e.g. urgent message type). Upon determining that the type of the message to be received is not a preset message type, at step 1815, the electronic device may determine the decoding start point according to a preset rule. The preset rule may include one of the schemes described in FIGS. 14 to 17.

Upon determining that the type of the message to be received is the preset message type, as a first embodiment, at step 1820, the electronic device may determine the decoding start point in accordance with the message type. For example, if the message to be received is of an urgent message type, the electronic device may start decoding from the start point of the repeated reception in accordance with the type of the message, start decoding from a preset decoding start point, or start decoding earlier by a preset time before the decoding start point determined according to the preset rule.

As a second embodiment, at step 1825, the electronic device may receive a signal (or message) and accumulate the bit energy of the received signal for soft combining. At step 1830, the electronic device may determine whether the decoding success probability exceeds a preset threshold on the basis of the accumulated bit energy. Upon determining that the decoding success probability does not exceed the preset threshold, the electronic device may repeatedly receive a signal to accumulate the bit energy. Upon determining that the decoding success probability exceeds the preset threshold, at step 1835, the electronic device may determine the decoding start point based on the time point at which the decoding success probability exceeds the threshold. For example, the electronic device may start decoding from the time point at which the decoding success probability exceeds the threshold.

Figure 19:
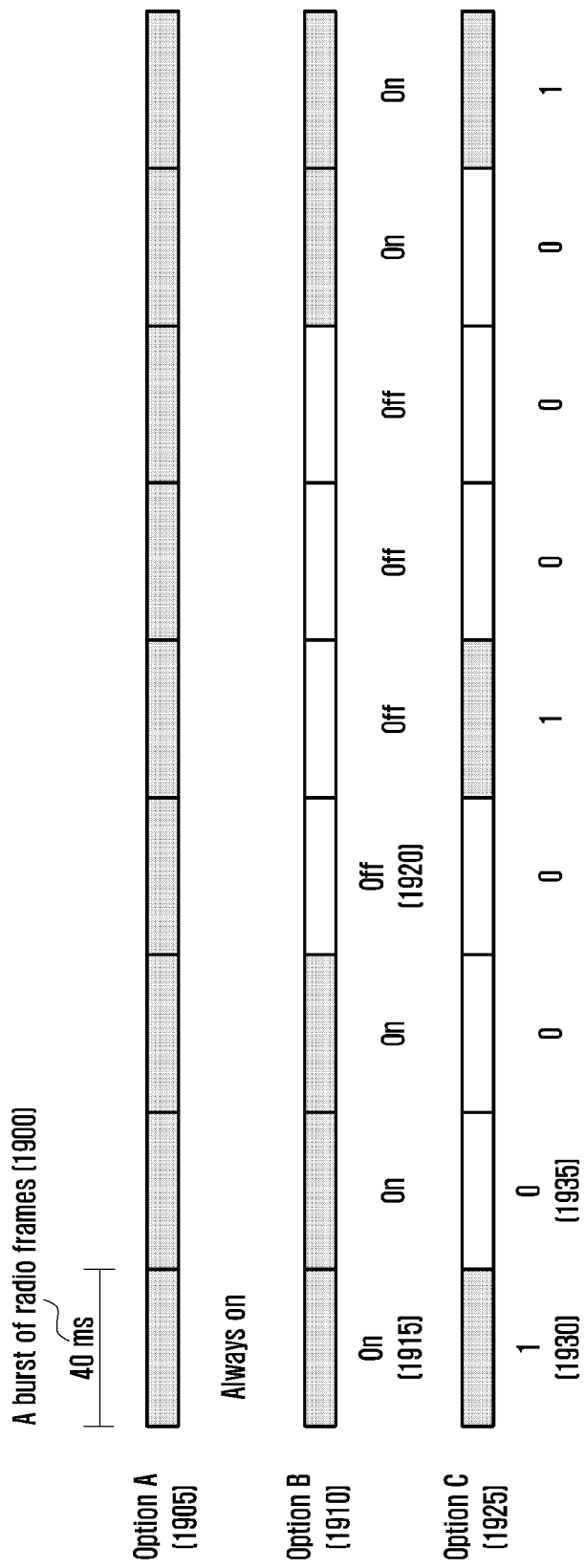
FIG. 19 depicts transmission of the MIB as a portion of system information in the extended coverage area according to the present invention.

FIG. 19 depicts transmission of the MIB as a portion of system information to the electronic device (e.g. MTC device, terminal) in the extended coverage area according to the present invention. For example, the MIB may be transmitted once at the first subframe every radio frame (10 ms). The MIB with the same information may be transmitted four times in total for a duration of 40 ms, and the MIB whose at least SFN information is updated may be transmitted for the next duration of 40 ms.

To enable the MTC devices in the extended coverage area to receive the MIB as a portion of system information, the MIB can be repeatedly transmitted for an extended duration in addition to four transmissions in each duration of 40 ms. As the system frame number (SFN) in the MIB changes every 40 ms, for soft combining, the MIB with the same information may be repeatedly transmitted for a duration of 40 ms (1900). For the next duration of 40 ms, the MIB with new information (with at least SFN information updated) may be repeatedly transmitted.

The MIB may always be transmitted in units of 40 ms as in option A (1905). In this case, the MTC device can receive the MIB and perform decoding at any time without delay. Instead, resources for MIB transmission should be allocated at all times.

In option B (1910), a time duration in which the MIB is transmitted can be configured through on-operation (1915) or off-operation (1920). On and off signaling can be sent to MTC devices by use of L1 parameters, MAC CE, or RRC messages. In the on duration, the MIB may be repeatedly transmitted for the MTC device; and, in the off duration, the MIB may be not transmitted for the MTC device. In the off duration, the MIB for regular terminals can still be transmitted.

In option C (1925), the MIB may be repeatedly transmitted for the MTC device according to a preset pattern. With, for example, a "1000" pattern, each digit may indicate whether the MIB is repeatedly transmitted for the MTC device in units of 40 ms. In the duration corresponding to '1' (1930), the MIB may be repeatedly transmitted for the MTC device; and, in the duration corresponding to '0' (1935), the MIB may be not transmitted for the MTC device. In the duration corresponding to '0', the MIB for regular terminals can still be transmitted. The pattern can be repeatedly applied until it is reset.

In the present invention, when option C is applied, a method is proposed in which the MTC device obtains the pattern information without separate signaling from the base station and uses the same to receive updated MIB information.

Figure 20:
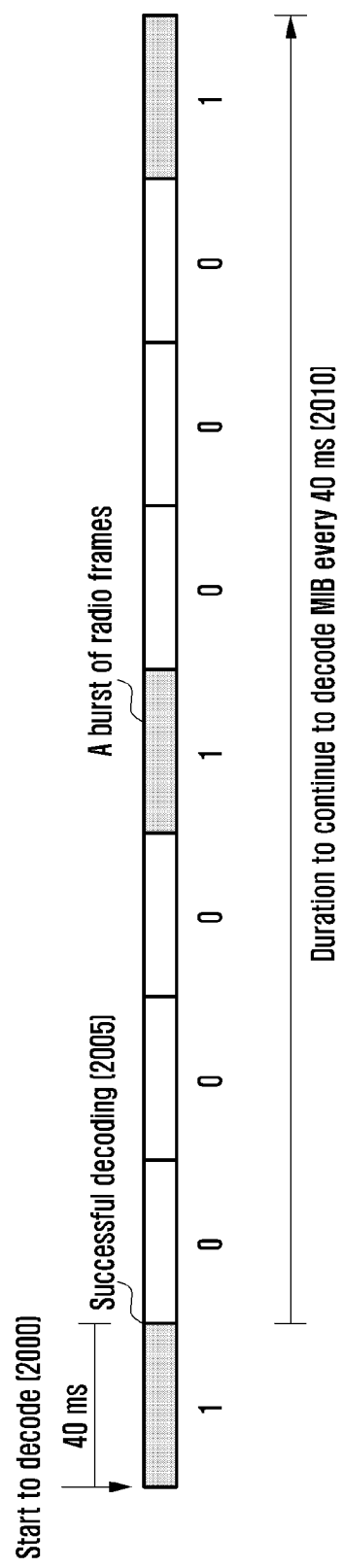
FIG. 20 illustrates acquisition of MIB pattern information according to an embodiment of the present invention.

FIG. 20 illustrates acquisition of MIB pattern information according to an embodiment of the present invention. When a specific event occurs, the MTC device should acquire MIB information (2000). The event may correspond to at least one of the following.

Power turn-on
Cell selection/reselection
Completion of handover
Completion of inter-RAT handover to LTE system from different system
Re-entering coverage area after leaving coverage area
Update of system information For example, when powered on, as the MTC device does not know the 40-ms duration where the MIB is transmitted, it continues blind decoding for the MIB in units of 40 ms. If the MIB is received during a 40-ms duration where the MIB is repeatedly transmitted and decoded, the MTC device can obtain the MIB information (2005). In the present invention, even if the MTC device has already obtained the MIB information, it continues MIB reception and decoding to acquire the MIB pattern information (2010). When blind decoding is continued for a certain period of time, the MTC device can predict that the MIB is repeatedly transmitted according to a preset pattern.

Figure 21:
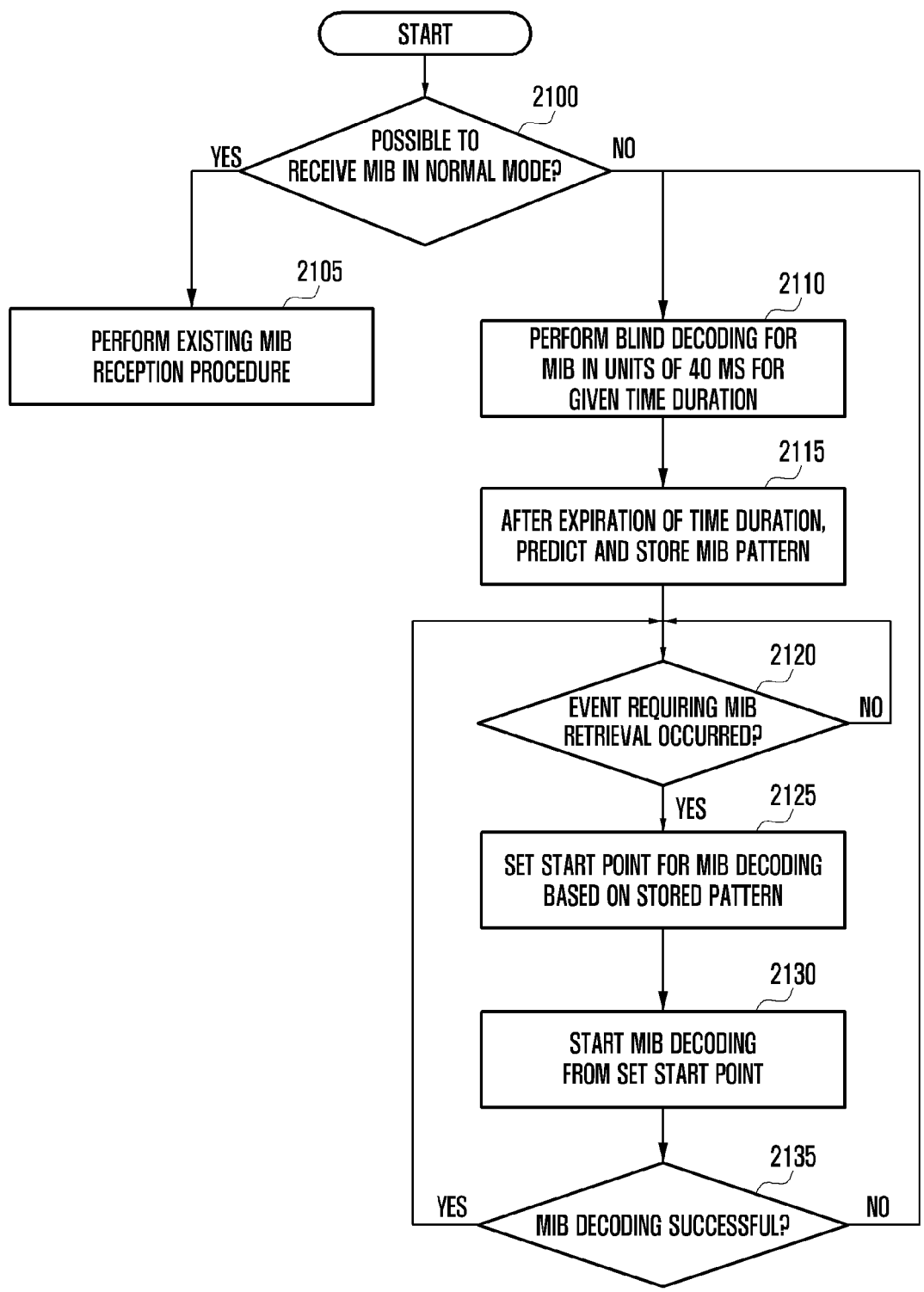
FIG. 21 illustrates a scheme for the electronic device to obtain the MIB pattern according to an embodiment of the present invention.

FIG. 21 illustrates a scheme for the electronic device (e.g. MTC device or terminal) to obtain the MIB pattern according to the present invention.

At step 2100, the MTC device may determine whether it is possible to receive the MIB in normal mode (e.g. using the normal coverage area) or in enhanced mode (e.g. using the enhanced coverage area).

Upon determining that it is possible to receive the MIB in normal mode, at step 2105, the MTC device performs the existing procedure for MIB reception.

Otherwise, upon determining that it is necessary to receive the MIB in enhanced mode, at step 2110, the MTC device may perform blind decoding for the MIB in units of 40 ms for a given time duration. Although the MIB is successfully decoded during the time duration, blind decoding is continued without interruption.

After expiration of the time duration, at step 2115, the MTC device may predict and store the MIB pattern by identifying a duration where MIB decoding has succeeded in units of 40 ms. At step 2120, the MTC device may determine whether an event requiring MIB retrieval has occurred. The event may correspond to at least one of the following.

Re-entering coverage area after leaving coverage area

Update of system information

In the case of an event such as cell reselection, handover or inter-RAT handover, the serving cell changes. If there is no assumption that all cells apply the same MIB pattern, the MIB pattern itself may be changed. In this case, it may be meaningless to use the stored MIB pattern.

If such an event has occurred, at step 2125, the MTC device may suspend MIB reception and decoding until a 40-ms duration permitting MIB reception arrives in consideration of the stored MIB pattern.

When the 40-ms duration arrives, at step 2130, the MTC device may start MIB reception and decoding. At step 2135, the MTC device may determine whether MIB decoding is successful. If MIB decoding is unsuccessful, as the predicted MIB pattern is erroneous, the procedure returns to step 2110 at which the MTC device may perform operations again for obtaining the MIB pattern.

Figure 22:
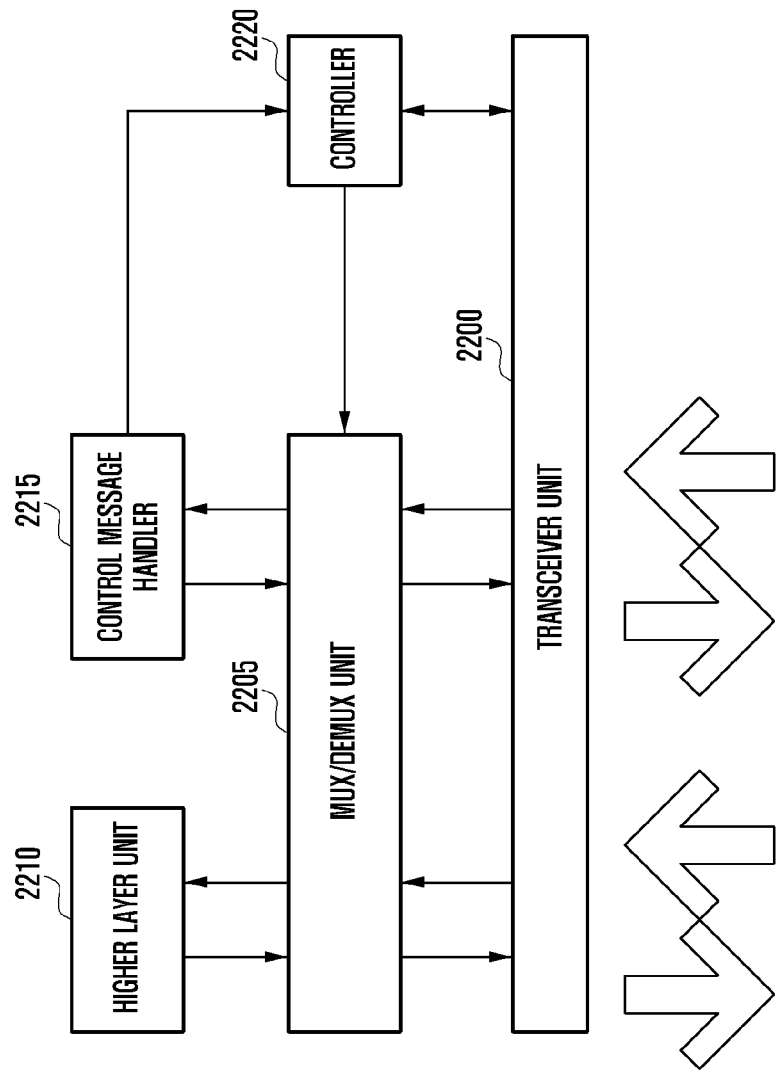
FIG. 22 is a block diagram showing the internal configuration of an electronic device.

FIG. 22 is a block diagram showing the internal configuration of an electronic device according to an embodiment of the present invention. The electronic device may operate as a terminal or MTC device. In addition, the electronic device may operate as a base station.

The electronic device may send and receive data to and from the higher layer unit 2210, and may send and receive control messages by use of the control message handler 2215. To send control or data signals to another electronic device, the electronic device multiplexes data through the mux/demux unit 2205 and sends the multiplexed data through the transceiver unit 2200 under the control of the controller 2220. To receive control or data signals from another electronic device, the electronic device receives a physical signal through the transceiver unit 2200, demultiplexes the received signal through the mux/demux unit 2205, and forwards the demultiplexed data to the higher layer unit 2210 or the control message handler 2215 according to the message contents under the control of the controller 2220.

In the above description, the electronic device is depicted as being composed of multiple blocks with different functions. However, the present invention is not limited thereto. For example, the function of the mux/demux unit 2205 may be performed directly by the controller 2220.

According to an embodiment of the present invention, the controller 2220 may obtain information on the repetition level for signal reception and determine the decoding start point and decoding period. When the decoding start point arrives, the controller 2220 may attempt to decode the repeatedly received signal at every decoding period on the basis of the repetition level information. The controller 2220 may accumulate the bit energy of the repeatedly received signal and attempt decoding based on the accumulated bit energy.

If decoding is successful, the controller 2220 may stop receiving the repeatedly transmitted signal.

In one embodiment, the controller 2220 may determine the decoding start point on the basis of a point of time when the signal is repeatedly received a given number of times corresponding to the repetition level that is lower than the repetition level information by a preset level (e.g. one level). In addition, the controller 2220 may start decoding from the point of time when the signal is repeatedly received a given number of times corresponding to the repetition level that is lower than the repetition level information by one level.

In one embodiment, the repetition level information may be determined through comparison between at least channel state information and at least one channel state threshold value. For example, the controller 2220 may compare the channel state information with the at least one channel state threshold value. The controller 2220 may determine the decoding start point with respect to the point of time when the signal is repeatedly received a given number of times corresponding to the repetition level that is lower than the repetition level information by a given level in consideration of the difference between the channel state information and the at least one channel state threshold value calculated through the comparison.

In one embodiment, the controller 2220 may determine whether the channel condition has changed after obtaining the repetition level information. Upon determining that the channel condition has not changed, the controller 2220 may determine the decoding start point with respect to the point of time when the signal is repeatedly received a given number of times corresponding to the repetition level that is lower than the repetition level information by a given level. Upon determining that the channel condition has changed, the controller 2220 may identify the variation in the channel status, and may determine the decoding start point with respect to the point of time when the signal is repeatedly received a given number of times corresponding to the repetition level that is lower than the repetition level information by a given level in consideration of the variation in the channel status.

In one embodiment, the controller 2220 may determine whether the decoding success probability is greater than or equal to a preset threshold on the basis of the accumulated bit energy of the repeatedly received signal, and may determine the decoding start point with respect to the point of time when the decoding success probability becomes greater than or equal to the preset threshold.

In one embodiment, the controller 2220 may determine whether a message to be received is of a given message type (e.g. emergency message). Upon determining that the message to be received is of the given message type, the controller 2220 may determine the decoding start point in accordance with the message type. Alternatively, upon determining that the message to be received is of the given message type, the controller 2220 may determine the decoding start point after determining whether the decoding success probability is greater than or equal to a preset threshold on the basis of the accumulated bit energy of the repeatedly received signal.

In one embodiment, the controller 2220 may determine the decoding period in consideration of at least one of channel state information, the type of a message to be received, and the variation in the channel status relative to the point in time when the repetition level information is obtained.

In various embodiments, each component of the electronic device described above may be composed of one or more elements, and component names may be varied according to the type of the electronic device. In various embodiments, the electronic device may be configured to include at least one of the aforementioned components, and an existing component may be omitted and a new component may be added. In various embodiments, some of the components of the electronic device may be combined into one entity while maintaining the same functionality.

In various embodiments, the terms "unit", "device" and "module" used in this document may refer to a certain unit that includes one of hardware, software and firmware or any combination thereof. The "module" may be interchangeably used with "unit", "logic", "logical block", "component", or "circuit", for example. The module may be the minimum unit of a single-bodied component or a part thereof. The module may be the minimum unit, or a part thereof, which performs one or more particular functions. The module may be realized mechanically or electronically. For example, the module may include at least one of ASIC (Application-Specific Integrated Circuit) chip, FPGAs (Field-Programmable Gate Arrays), and programmable-logic device, which have been known or are to be developed.

Hereinabove, various embodiments of the present disclosure have been shown and described for the purpose of illustration without limiting the subject matter of the present disclosure. It should be understood by those skilled in the art that many variations and modifications of the method and apparatus described herein will still fall within the spirit and scope of the present disclosure as defined in the appended claims and their equivalents.

The invention claimed is:

1. A method of signal processing for an electronic device in a mobile communication system, the method comprising:
    obtaining repetition level information to receive a message repeatedly based on channel state information;
    determining a decoding start point and a decoding interval based on the channel state information and the repetition level information; and
    in case that the decoding start point arrives, attempting to decode the repeatedly received message based on the decoding interval.

2. The method of claim 1, further comprising stopping the reception of the message in case that decoding is successful.

3. The method of claim 1, wherein determining the decoding start point comprises:
    determining the decoding start point based on points of time when the message is repeatedly received a number of times corresponding to a repetition level that is lower than the repetition level information by a preset level.

4. The method of claim 1, wherein the repetition level information is determined based on a comparison between the channel state information and at least one channel state threshold value, and
    wherein determining the decoding start point comprises:
        comparing the channel state information with the at least one channel state threshold value; and
        determining the decoding start point based on points of time when the message is repeatedly received a number of times corresponding to a repetition level that is lower than the repetition level information by a preset level based on a difference between the channel state information and the at least one channel state threshold value.

5. The method of claim 1, further comprising determining whether a channel condition has changed after obtaining the repetition level information, and wherein determining the decoding start point comprises:
    determining, in case that the channel condition has not changed, the decoding start point based on points of time when the message is repeatedly received a number of times corresponding to a repetition level that is lower than the repetition level information by a preset level; and
    identifying, in case that the channel condition has changed, an error rate of a channel status, and determining the decoding start point based on the points of time when the message is repeatedly received the number of times corresponding to the repetition level that is lower than the repetition level information by the preset level based on the error rate.

6. The method of claim 1, wherein determining the decoding start point comprises at least one of:
    identifying whether a decoding success probability is greater than or equal to a preset threshold based on an accumulated bit energy of the repeatedly received message, and determining the decoding start point based on points of time when the decoding success probability becomes greater than or equal to the preset threshold; and
    identifying whether the message is a predetermined message type, and, in case that the message to be received is the predetermined message type, determining the decoding start point based on the type of the message.

7. The method of claim 1, wherein determining the decoding interval comprises:
    determining the decoding interval based on at least one of the channel state information, a type of the message, or an error rate of a channel status in a time that the repetition level information is obtained.

8. An electronic device capable of signal processing in a mobile communication system, comprising:
    a transceiver; and
    a controller coupled with the transceiver and configured to:
        obtain repetition level information to receive a message repeatedly based on channel state information,
        determine a decoding start point and a decoding interval based on the channel state information and the repetition level information, and
        attempt, in case that the decoding start point arrives, to decode the repeatedly received message based on the decoding interval.

9. The electronic device of claim 8, wherein the controller is further configured to stop the reception of the message in case that decoding is successful.

10. The electronic device of claim 8, wherein the controller is configured to determine the decoding start point based on points of time when the message is repeatedly received a number of times corresponding to a repetition level that is lower than the repetition level information by a preset level.

11. The electronic device of claim 8, wherein the repetition level information is determined based on a comparison between the channel state information and at least one channel state threshold value, and wherein the controller is configured to:
    compare the channel state information with the at least one channel state threshold value, and
    determine the decoding start point based on points of time when the message is repeatedly received a number of times corresponding to a repetition level that is lower than the repetition level information by a preset level based on a difference between the channel state information and the at least one channel state threshold value.

12. The electronic device of claim 8, wherein the controller is configured to determine whether a channel condition has changed after obtaining the repetition level information,
    wherein, in case that the channel condition has not changed, the controller is configured to determine the decoding start point based on points of time when the message is repeatedly received a given number of times corresponding to a repetition level that is lower than the repetition level information by a preset level, and
    wherein, in case that the channel condition has changed, the controller is configured to identify an error rate of a channel status and determine the decoding start point based on the points of time when the message is repeatedly received the number of times corresponding to the repetition level that is lower than the repetition level information by the preset level based on the error rate.

13. The electronic device of claim 8, wherein the controller is configured to:
    identify whether a decoding success probability is greater than or equal to a preset threshold based on an accumulated bit energy of the repeatedly received message, and
    determine the decoding start point based on points of time when the decoding success probability becomes greater than or equal to the preset threshold.

14. The electronic device of claim 8, wherein the controller is configured to identify whether the message is a predetermined message type, and
    wherein, in case that the message is the predetermined message type, the controller is configured to determine the decoding start point based on the type of the message.

15. The electronic device of claim 8, wherein the controller is configured to determine the decoding interval based on at least one of the channel state information, a type of the message, or an error rate of a channel status in a time that the repetition level information is obtained.

* * * * *